(12) United States Patent
Lindholm et al.

(10) Patent No.: US 7,324,112 B1
(45) Date of Patent: Jan. 29, 2008

(54) SYSTEM AND METHOD FOR PROCESSING DIVERGENT SAMPLES IN A PROGRAMMABLE GRAPHICS PROCESSING UNIT

(75) Inventors: John Erik Lindholm, Saratoga, CA (US); Harold Robert Feldman Zatz, Palo Alto, CA (US); Christian Rouet, San Rafael, CA (US); Rui M. Bastos, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 591 days.

(21) Appl. No.: 10/823,282

(22) Filed: Apr. 12, 2004

(51) Int. Cl.
*G06T 1/00* (2006.01)
*G06T 1/20* (2006.01)
*G06F 15/16* (2006.01)

(52) U.S. Cl. ............... 345/522; 345/502; 345/506

(58) Field of Classification Search ......... 345/522, 345/501, 502, 506, 503, 426, 419; 712/233, 712/241, 245, 247, 234
See application file for complete search history.

(56) References Cited

U.S. PATENT DOCUMENTS

| | | | |
|---|---|---|---|
| 4,794,521 A | 12/1988 | Ziegler et al. | |
| 4,837,681 A | 6/1989 | Fuller | |
| 5,787,272 A | 7/1998 | Gupta et al. | |
| 5,943,682 A | 8/1999 | Park et al. | |
| 5,953,530 A | 9/1999 | Rishi et al. | |
| 6,076,157 A | 6/2000 | Borkenhagen et al. | |
| 6,115,083 A | 9/2000 | Doherty et al. | |
| 6,173,394 B1* | 1/2001 | Guttag et al. ........ | 712/226 |
| 6,182,211 B1 | 1/2001 | Yamasaki | |
| 6,236,413 B1* | 5/2001 | Gossett et al. ........ | 345/506 |
| 6,252,610 B1* | 6/2001 | Hussain ............ | 345/506 |
| 6,292,887 B1 | 9/2001 | Janniello | |
| 6,473,829 B1 | 10/2002 | Dahman et al. | |
| 6,502,165 B1 | 12/2002 | Kishi et al. | |
| 6,560,693 B1 | 5/2003 | Puzak et al. | |
| 6,658,490 B1 | 12/2003 | Williams et al. | |
| 6,825,843 B2* | 11/2004 | Allen et al. ........ | 345/522 |
| 6,864,892 B2 | 3/2005 | Lavelle et al. | |
| 6,867,781 B1 | 3/2005 | Van Hook et al. | |
| 6,941,326 B2 | 9/2005 | Kadyk et al. | |
| 6,966,057 B2* | 11/2005 | Lueh ............ | 717/158 |
| 7,013,382 B1 | 3/2006 | Nguyen | |
| 7,015,913 B1 | 3/2006 | Lindholm et al. | |
| 7,039,794 B2 | 5/2006 | Rodgers et al. | |
| 2003/0169259 A1 | 9/2003 | Lavelle et al. | |
| 2004/0078690 A1 | 4/2004 | Kohashi | |
| 2004/0133777 A1* | 7/2004 | Kiriansky et al. ...... | 713/166 |
| 2004/0148491 A1 | 7/2004 | Damron | |
| 2004/0218227 A1 | 11/2004 | Enomoto | |
| 2004/0243792 A1 | 12/2004 | Stoodley | |
| 2005/0050305 A1 | 3/2005 | Kissell | |
| 2005/0138639 A1 | 6/2005 | Hagan | |

\* cited by examiner

*Primary Examiner*—Ulka Chauhan
*Assistant Examiner*—Joni Hsu
(74) *Attorney, Agent, or Firm*—Patterson & Sheridan, LLP

(57) ABSTRACT

A method for processing divergent samples in a programmable graphics processing unit is described. In one embodiment, the method includes the step of incrementing a subroutine depth of a first sample to designate that first call instructions are to be executed on the first sample. The method also includes the steps of pushing state data of a second sample upon which the first call instructions are not to be executed onto a global stack and executing the first call instructions on the first sample.

24 Claims, 14 Drawing Sheets

SYSTEM AND METHOD FOR PROCESSING DIVERGENT SAMPLES IN A PROGRAMMABLE GRAPHICS PROCESSING UNIT

FIELD OF THE INVENTION

The present invention generally relates to graphics processing and more specifically to a system and method for processing divergent samples in a programmable graphics processing unit.

BACKGROUND

Current graphics data processing includes systems and method developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining and then attempt to process graphics data in parallel in the different parts of the graphics pipeline. Such techniques allow graphics resources and computation results to be shared, thereby increasing processing efficiency. Inflexible parallel processing of graphics data, however, limits the performance of graphics processors, especially if the processing is synchronous. For example, allowing a subset of the graphics data to diverge to execute a conditional branch, a jump, call return or the like may be preferable under certain conditions.

Accordingly, it would be desirable to provide graphics processing techniques that retain the efficiencies of synchronous processing, but also accommodate these types of divergences.

SUMMARY

One embodiment of a method for processing divergent samples in a programmable graphics processing unit includes the step of incrementing a subroutine depth of a first sample to designate that first call instructions are to be executed on the first sample. The method also includes the steps of pushing state data of a second sample upon which the first call instructions are not to be executed onto a global stack and executing the first call instructions on the first sample.

One advantage of the disclosed method is that it enables a graphics processor to accommodates divergences in the fragment processing pipeline that are related to a call-return or the like. This capability increases the flexibility of a SIMD-oriented system by enabling such a system to operate in a divergent mode when doing so is desired.

DETAILED DESCRIPTION

Figure 1:
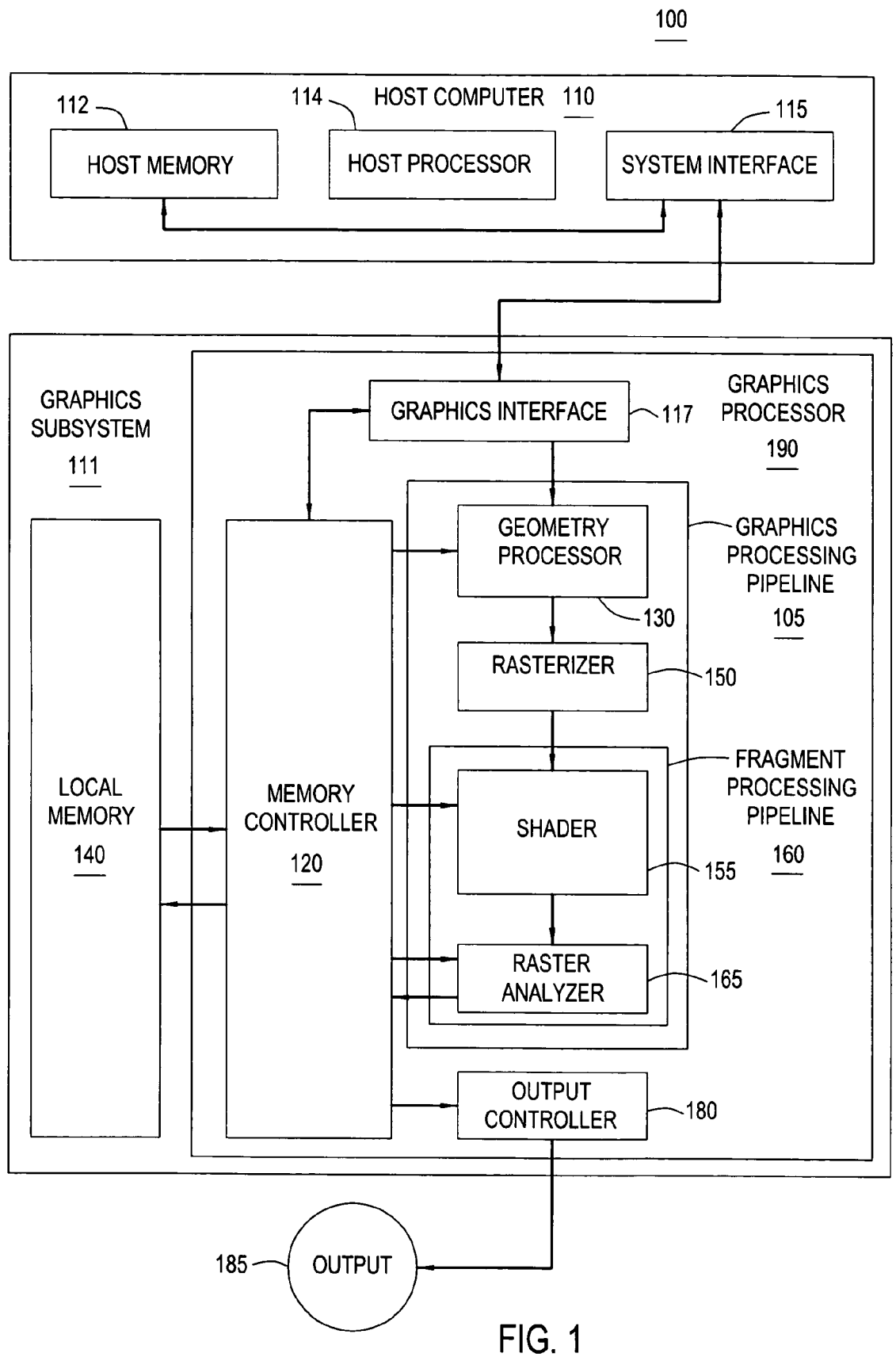
FIG. 1 is a block diagram illustrating a computing system, according to one embodiment of the invention.

FIG. 1 is a block diagram illustrating a computing system 100, according to one embodiment of the invention. As shown, computer system may include, without limitation, a host computer 110 and a graphics subsystem 111. Computing system 100 may be a desktop computer, server, laptop computer, palm-sized computer, tablet computer, game console, cellular telephone, computer based simulator, or the like. Host computer 110 includes a host processor 114, which may include a system memory controller to interface directly to a host memory 112 or may communicate with host memory 112 through a system interface 115. System interface 115 may be an I/O (input/output) interface of a bridge device including the system memory controller to interface directly to host memory 112.

Host computer 110 communicates with graphics subsystem 111 via system interface 115 and a graphics interface 117. Data received at graphics interface 117 can be passed to a geometry processor 130 or written to a local memory 140 through memory controller 120. Memory controller 120 is configured to handle data sizes from typically 8 to more than 128 bit. For example, in one embodiment, memory controller 120 is configured to receive data through graphic interface 117 from a 64-bit wide external bus 115. The 32-bit data is internally interleaved to form 128 or 256-bit data types.

A graphics processing pipeline 105 may include, without limitation, geometry processor 130 and a fragment processing pipeline 160, each of which contains one or more programmable graphics processing units that perform a variety of specialized functions. Such functions include, without limitation, table lookup, scalar and vector addition, multiplication, division, coordinate-system mapping, calculation of vector normal, tessellation, and calculation of derivatives, interpolation and the like. Geometry processor 130 and fragment processing pipeline 160 are optionally configured such that data processing operations are performed in multiple passes through graphics processing pipeline 105 or in multiple passes through fragment processing pipeline 160.

Geometry processor 130 receives a stream of program instructions and vertex data and performs vector floating-point operations or other processing operations. Processed vertex data is passed from geometry processor 130 to a rasterizer 150. In a typical implementation, rasterizer 150 performs scan conversion and outputs fragment, pixel, or sample data, including vertex data, as well as program instructions to fragment processing pipeline 160. Alternatively, rasterizer 150 resamples input vertex data and outputs additional vertices. Fragment Processing Pipeline 160 may thus be programmed to operate on surface, primitive, vertex, fragment, pixel, sample or any other data. For simplicity, the term "samples" is hereinafter used to refer to surfaces, primitives, vertices, pixels, fragments or the like.

Just as geometry processor 130 and fragment processing pipeline 160 are optionally configured such that data processing operations are performed in a multiple passes, a shader 155, within fragment processing pipeline 160, is optionally configured using fragment programs such that data processing operations are performed in multiple passes through a recirculating pipeline within shader 155. Fragment programs are composed of program instructions compiled for execution within fragment processing pipeline 160.

Data processed by shader 155 is passed to a raster analyzer 165, which performs near and far plane clipping and raster operations, such as stencil, z test, etc., and saves the results in local memory 140. Raster analyzer 165 includes a read interface and a write interface to memory controller 120, through which raster analyzer 165 accesses data stored in local memory 140. Traditionally, the precision of the sample data written to memory is limited to the color display resolution (24 bits) and depth (16, 24, or 32 bits). Because graphics processing pipeline 105 is designed to process and output high resolution data, the precision of data generated by graphics processing pipeline 105 need to be limited prior to storage in local memory 140. For example, in various embodiments the output of raster analyzer 165 is 32, 64, 128-bit or higher precision, fixed or floating-point data. These data are written from raster analyzer 165 through memory controller 120 to local memory 140 either through multiple write operations or through an internal bus (not shown).

When processing is complete, an output 185 of graphics subsystem 111 is provided using an output controller 180. Output controller 180 is optionally configured to deliver data to a display device, network, electronic control system, other computing system 100, other graphics subsystem 111, or the like.

Figure 2:
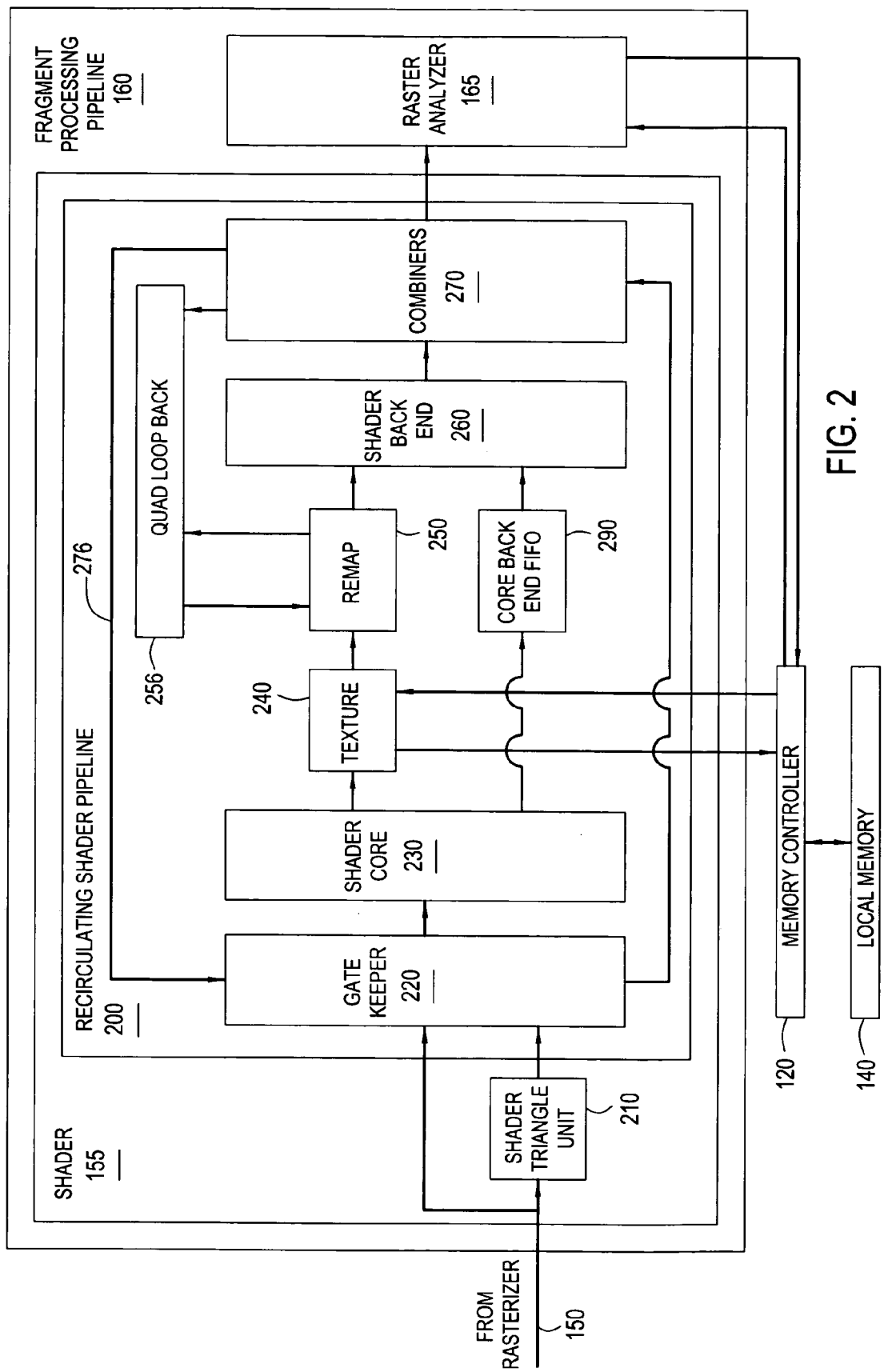
FIG. 2 is a block diagram illustrating the fragment processing pipeline of FIG. 1, including the shader and the raster analyzer, according to one embodiment of the invention.

FIG. 2 is a block diagram illustrating fragment processing pipeline 160 of FIG. 1, including shader 155 and raster analyzer 165, according to one embodiment of the invention. Shader 155 and raster analyzer 165 process samples that include sample data such as color, depth, texture coordinates, and the like, using program instructions compiled from user-defined fragment programs. The program instructions and sample data are stored in memory, e.g., any combination of local memory 140 and host memory 112.

Within shader 155, program instructions are converted into codewords that control the processing to be done by the computational units in fragment processing pipeline 160.

As shown, shader 255 is comprised of a number of different units. A shader triangle unit 210 calculates plane equations for texture coordinates, depth, and other parameters. Each of a gate keeper 220, a shader core 230, a texture 240, a remap 250, a shader back end 260 and a combiners 270 is a graphics processing unit coupled together to form a recirculating shader pipeline 200. Of these graphics processing units, each of shader core 230, shader back end 260 and combiners 270 includes a plurality of programmable computation units that may be configured using codewords to perform arithmetic operations such as, for example, dot products, interpolation, multiplication, division and the like. A core back end FIFO (first in first out) 290 and a quad loop back 256 are storage resources, e.g., register file, FIFO, or memory, included in recirculating shader pipeline 200. Gate keeper 220 performs a multiplexing function, selecting between the pipeline data from rasterizer 150, shader triangle unit 210, a feedback output 276 or combiners 270. Shader core 230 initiates local memory 140 read requests that are processed by memory controller 120 to read map data (height field, bump, texture, etc.) and program instructions. Shader core 230 also performs floating point computations such as triangle parameter interpolation and reciprocals. Sample data processed by shader core 230 is optionally input to a core back end FIFO 290.

The read map data or program instructions, read by shader core 230 via memory controller 120, are returned to texture 240. Texture 240 unpacks and processes the read map data that is then output to remap 250 along with the program instructions. As described in further detail herein, remap 250 converts program instructions into one or more codewords that control the processing done by the various graphics processing units in fragment processing pipeline 160.

When multi-pass operations are being performed within shader 155, remap 250 also reads the data fed back from combiners 270 via quad loop back 256, synchronizing the fed back data with the processed map data and program instructions received from texture 240. Remap 250 formats the processed map data and fed back data, outputting codewords and formatted data to shader back end 260. Shader back end 260 receives sample data from shader core 230 via core back end FIFO 290 and triangle data from gate keeper 220. Shader back end 260 synchronizes the sample and triangle data with the formatted data from remap 250. Shader back end 260 performs computations using the input data (formatted data, sample data, and triangle data) based on codewords received from remap 250. Shader back end 260 outputs codewords and shaded data.

The output of shader back end 260 is input to combiners 270 where the codewords are executed by the programmable computation units within combiners 270 that, in turn, output combined sample data. The codewords executing in the current pass control whether the combined sample data will be fed back within shader 155 and processed in a subsequent pass. Combiners 270 optionally output codewords, which are executed by shader core 230, to gate keeper 220 using feedback path 276. Combiners 270 also optionally output combined sample data to quad loop back 256 that may be used by remap 250 in a subsequent pass. Finally, combiners 270 optionally output combined sample data and sample data, e.g., x, y, color, depth, and the like to raster analyzer 165. Raster analyzer 165 performs raster operations, such as stencil, z test, etc., using the combined sample data and sample data stored in local memory 140 at the x, y location associated with the combined sample data. The output data from raster analyzer 165 is written back to local memory 140 via memory controller 120 at the x, y locations associated with the output data. The output data may be written as 16 or 32 bit per pixel RGBA (red, green, blue, alpha) to a scanned out for display or used as a texture map by a fragment program executed in a subsequent pass within fragment processing pipeline 160 or through graphics processing pipeline 105. Alternatively, color and depth data may be written, and later read and processed by raster analyzer 165 to generate the final pixel data prior to being scanned out for display via output controller 180.

One characteristic of the system disclosed in FIGS. 1 and 2 is that it embodies a single-instruction, multiple-data ("SIMD") architecture. Accordingly, once a programmable computation unit has been configured by a codeword, the programmable computation unit executes the same operation on many independent pieces of data (e.g., samples with corresponding sample data, such as color, depth, texture coordinates, etc.) associated with a graphics primitive, before being reconfigured. As described in further detail herein, through the use of a program counter ("PC") token assigned to a group of samples processed in recirculating shader pipeline 200, the same PC is assigned to the samples of the group to enable this functionality. Another characteristic is that a plurality of codewords typically may be processed in the same pass through recirculating shader pipeline 200 because the graphics processing units therein have a plurality of programmable computation units.

Figure 3:
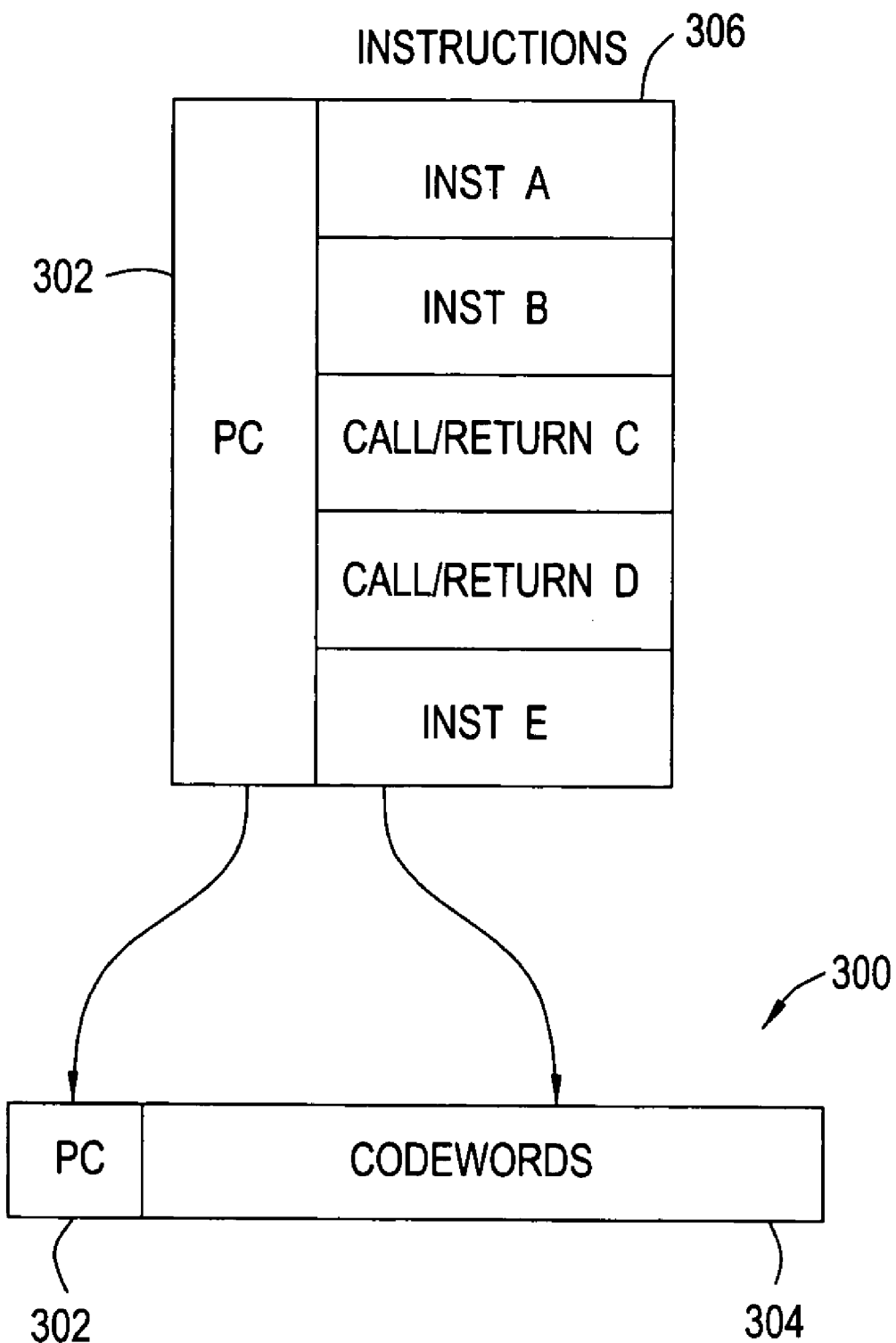
FIG. 3 is a conceptual diagram illustrating a PC token, according to one embodiment of the invention.

FIG. 3 is a conceptual diagram illustrating a PC token 300, according to one embodiment of the invention. PC token 300 comprises a data structure that may be configured to cause the various programmable computation units in recirculating shader pipeline 200 to execute an instruction sequence 306 comprising one or more instructions of a fragment program on a specified group of samples. As shown, PC token 300 may include, without limitation, a PC 302 and a codeword portion 304. PC 302 specifies the location of the one or more instructions of instruction sequence 306. PC 302 may be a physical address in the graphics memory (i.e., portions of host memory 112, local memory 140 directly coupled to graphics processor 190, register files coupled to the computation units within programmable graphics processor 190 and the like), an index to a location in a local storage resource that contains a physical memory address or the one or more instructions, an offset from a value in a register that contains a physical memory address, or the one or more instructions or the like. Notably, since one PC token is assigned to a group of samples, each sample of the group has the same PC. Such a configuration enables the one or more instructions in instruction sequence 306 to be executed on each sample of the group synchronously, unless a call-return divergence occurs, as described in further detail herein.

As previously described herein, remap 250 converts the one or more program instructions of instruction sequence 306 into corresponding codewords. These codewords are included in codeword potion 304 of PC token 300. More specifically, codeword portion 304 includes a plurality of fields, wherein each programmable computation unit of recirculating shader pipeline 200 is associated with at least one of those fields. A given codeword may be scheduled for execution by a particular programmable computation unit by placing that codeword in a field of codeword portion 304 associated with the particular programmable computation unit. Further, remap 250 is configured to dispatch PC token 300 into recirculating shader pipeline 200 followed by the specified group of samples upon which the one or more instructions of instruction sequence 306 are to be executed.

Once dispatched, PC token 300 traverses the graphics processing units within recirculating shader pipeline 200 in a first (and maybe the only) pass. The codewords included in PC token 300 configure the various computation units associated with those codewords to perform the operations specified in the one or more instructions corresponding to the codewords on the subsequently dispatched group of samples during the single pass. As persons skilled in the art will understand, additional passes may be used to further process the specified group of samples using either different codewords or the same codewords. Likewise, additional passes may be used to execute operations specified by a given set of codewords on either a different specified group of samples or the same specified group of samples.

A group of samples may include any number of samples that are related to one another in some fashion. For example, the samples of a group may have some sort of information sharing relationship between them such that efficiencies may be achieved by synchronously processing the samples in fragment processing pipeline 160. In one embodiment, a group comprises two or more pixels or fragments in a primitive. In an alternative embodiment, a group may comprise two or more pixels or fragments in a particular object or part of an object. Please note that for illustrative purposes only, in various parts of the remaining disclosure, a group is assumed to comprise four samples in a particular primitive. This group will be hereinafter referred to as "group A."

Figure 4:
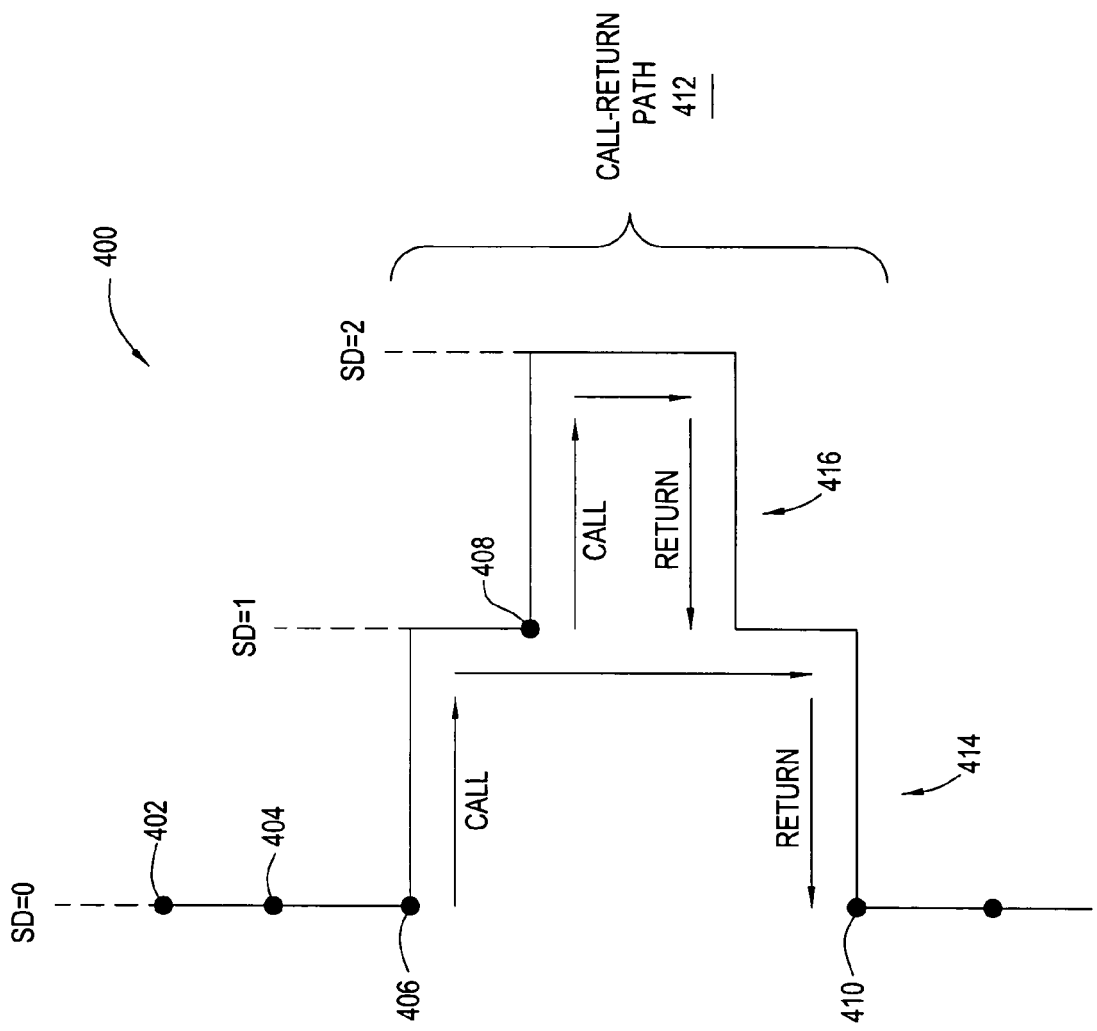
FIG. 4 is a conceptual diagram illustrating a program flow corresponding to the one or more instructions of the instruction sequence of FIG. 3, according to one embodiment of the invention.

FIG. 4 is a conceptual diagram illustrating a program flow 400 corresponding to the one or more instructions of instruction sequence 306 of FIG. 3, according to one embodiment of the invention. As shown, program flow 400 includes an instruction 402, which corresponds to Inst A of instruction sequence 306, an instruction 404, which corresponds to Inst B of instruction sequence 306, an instruction 406, which corresponds to Call/Return C of instruction sequence 306, an instruction 408, which corresponds to Call/Return D of instruction sequence 306, and an instruction 410, which corresponds to an Inst E of instruction sequence 306. As also shown, program flow 400 includes a call-return path 412, comprising a first call-return 414, corresponding to instruction 406, and a second call-return 416, corresponding to instruction 408. As persons skilled in the art will recognize, each of first call-return 414 and second call-return 416 may correspond, for example, with a different subroutine of a particular fragment program.

As described above in conjunction with FIG. 3, at instruction 402, remap 250 generates one or more PC tokens to cause the various programmable computation engines in recirculating shader pipeline 200 to execute the operations specified in Inst A on all of the samples of group A. Similarly, at instructions 404 and 410, remap 250 generates one or more PC tokens for executing the operations specified in Inst B and Inst E, respectively, on all of the samples of group A. Again, as persons skilled in the art will recognize, executing the operations specified in a given instruction on all of the samples of group A is consistent with the nature of a SIMD architecture.

At instruction 406 and instruction 408, however, program flow 400 may be structured such that the call-return operations specified in Call/Return C and Call/Return D of instruction sequence 306 are not executed on all of the samples of group A. For example, suppose that program flow 400 is structured such that the call-return operations specified in Call/Return C are executed on only the second and third samples in group A, and the call-return operations in Call/Return D are executed only on the third sample in group A. Such a situation is referred to as a "divergence" in a SIMD architecture since operations are performed on the second and third samples of group A that are not performed the first and fourth samples.

As described in further detail below in conjunction with FIGS. 5 and 6A/6B, when such a divergence occurs, the system disclosed in FIGS. 1 and 2 is configured to hold "idle" the samples in group A that do not have call-return operations executed on them (sometimes referred to as the "non-divergent" samples). The disclosed system is further configured to track the progression of the samples in group A that do have call-return operations performed on them (sometimes referred to as the "divergent" samples) and to execute the call-return operations on those samples in a specific manner that enables the samples of group A become "non-divergent" once the call-return operations are completed. When the samples of group A become non-divergent, the disclosed system is able to process the samples of group A once again in a manner consistent with a SIMD architecture (i.e., executing the operations specified in each instruction in program flow 400 on all samples of group A).

More specifically, the system of FIGS. 1 and 2 is configured to associate a subroutine depth ("SD") (also referred to as a "stack depth") with each nesting level of the call-returns that comprise a given call-return path in program flow 400. For example, as shown in FIG. 4, first call-return 414 resides in the first nesting level of call-return path 412. The SD associated with first call-return 414 therefore has a value of 1. Similarly, second call-return 414 resides in the second nesting level of call-return path 412, indicating that second call-return 414 is nested within first call-return 414. The SD associated with second call-return 414 therefore has a value of 2. By contrast, instructions 402, 404 and 410 in program flow 400 do not include any call-return instructions. For this reason, the SD associated with these instructions has a value of 0. The system of FIGS. 1 and 2 is further configured to track the SDs of the divergent samples and to execute the call-return operations on those samples in a specific order based on the SD of each sample such that the samples of group A become "non-divergent" once the call-return operations are completed.

Figure 5:
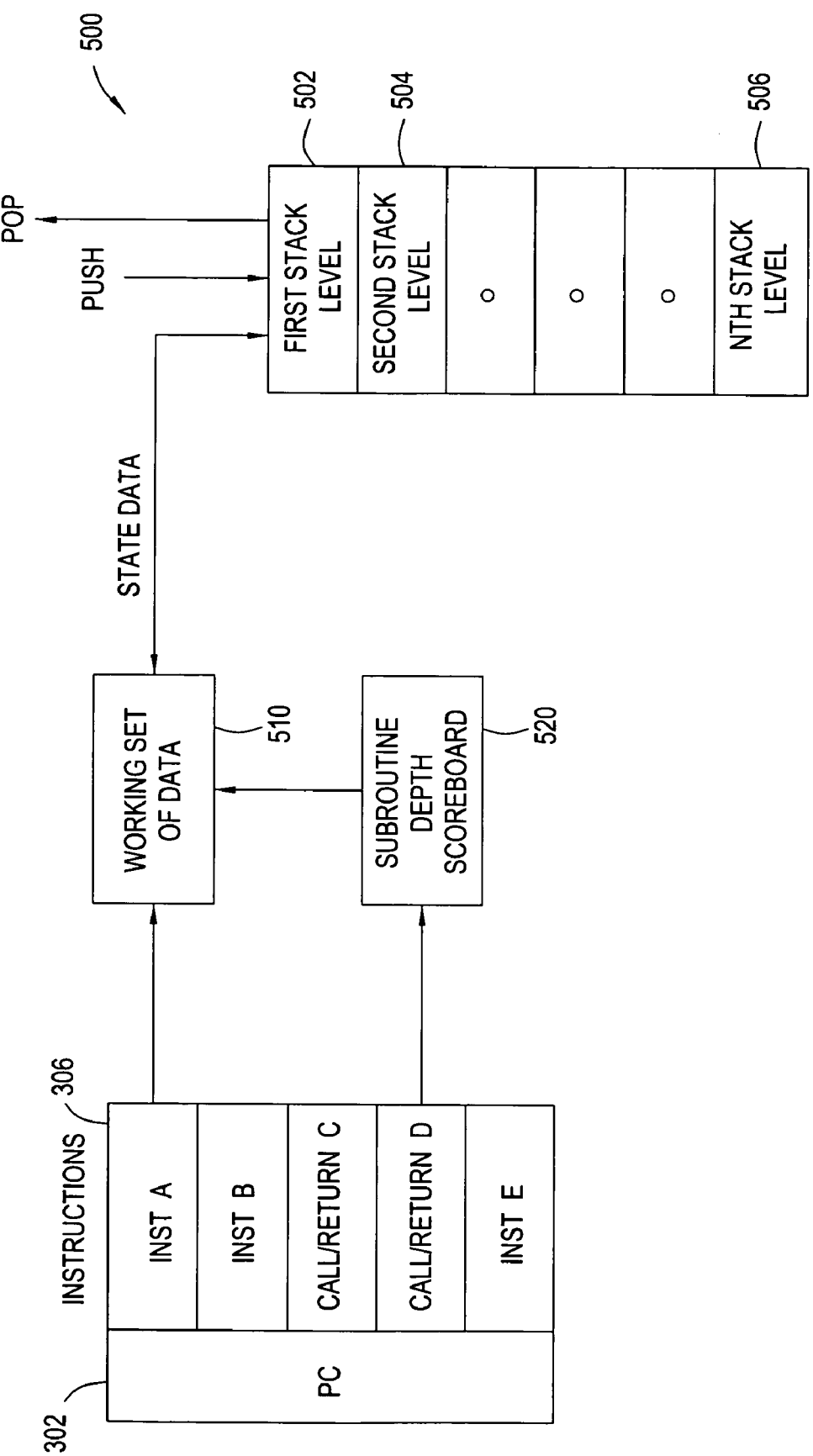
FIG. 5 is a conceptual diagram of a global stack and a stack depth scoreboard used to track the divergence of one or more samples in the program flow of FIG. 4, according to one embodiment of the invention.

FIG. 5 is a conceptual diagram of a global stack 500 and a stack depth scoreboard 520 used to track the divergence of one or more samples in program flow 400 of FIG. 4, according to one embodiment of the invention. As shown, global stack 500 comprises a data structure that may include any arbitrary number of stack levels as represented by a first stack level 502, a second stack level 504 and continuing up to and including an Nth stack level 506. Each stack level is configured to store state data, which may include any type of information related to processing one or more samples of a group in recirculating shader pipeline 200. For example, state data may include a pointer to one or more samples, the sample type (e.g., pixel, fragment, vertex, primitive or the like) of one or more samples, the PC associated with one or more samples, a pointer specifying the destination location of one or more processed samples, a pointer to the output pixel or fragment position of one or more processed samples and the like. As described in further detail herein, subroutine depth scoreboard 520 is configured to enable remap 250 to track the SD of each sample being processed in recirculating shader pipeline 200. In one embodiment, both global stack 500 and subroutine depth scoreboard reside in remap 250.

Referring back to the example posited in conjunction with FIG. 4, suppose a divergence occurs in program flow 400 such that the call-return operations specified in Call/Return C (corresponding to program instruction 406) are executed on both the second and third samples of group A, and the call-return operations specified in Call/Return D (corresponding to program instruction 408) are executed on only the third sample of group A. In one embodiment, remap 250 is configured first to increment the SD of each of the second and the third samples of group A in subroutine depth scoreboard 520, giving the first and fourth samples SDs equal to zero and the second and third samples SDs equal to one. The SDs of the first and fourth samples indicate that no call (or return) operations specified in either Call/Return C or Call/Return D are to be executed on those samples. By contrast, the SDs of the second and third samples indicate that the call operations of first call-return 414 specified in Call/Return C are to be executed on both the second and third samples.

Remap 250 is configured then to hold "idle" the first and fourth samples in group A, as these samples do not have any call (or return) operations executed on them. More specifically, remap 250 is configured to encode each of the first and fourth samples with information indicating that the various programmable computation units in recirculating shader pipeline 200 should not perform any operations on those samples. Remap 250 also is configured to push the state data of each of the idle samples (i.e., the state data of each of the first and fourth samples) onto global stack 500. In one embodiment, remap 250 is configured to write the state data of each of the first and fourth samples to first stack level 502 of global stack 500. The consequence of pushing the state data of the first and fourth samples onto global stack 500 in that the first and fourth samples are removed from working set of data 510, which includes all samples upon which operations are performed in recirculating shader pipeline 200.

In addition, remap 250 is configured to generate a PC token that includes the codewords to configure the various programmable computation units of recirculating shader pipeline 200 to execute the call operations specified in Call/Return C. Finally, remap 250 is configured to dispatch the PC token into the pipeline, followed by the first, second, third and fourth samples of group A. As the first and fourth samples of group A are encoded with non-op information, these samples are simply "along for the ride," meaning that these samples are not processed during the pass through recirculating shader pipeline 200.

After the call operations specified in Call/Return C are executed on the second and third samples, remap 250 is configured to increment the SD of the third sample of group A in subroutine depth scoreboard 520, giving the third sample an SD equal to 2. The SD of the third sample (and the unchanged SDs of the first, second and fourth samples) indicates that the call operations of second call-return 414 specified in Call/Return D are to be executed on only the third sample. Remap 250 is configured then to hold "idle" the second sample in group A (in addition to holding the first and fourth samples idle) as these sample does not have any call or return operations specified in Call/Return D executed on them. Again, remap 250 is configured to encode the second sample (as well as the first and fourth samples) with no-op information such that the various programmable computation units in recirculating shader pipeline 200 do not perform any operations on these samples.

Remap 250 also is configured to push the state data of the second sample onto global stack 500. In one embodiment, remap 250 is configured to write the state data of the first and fourth samples residing in first stack level 502 to second stack level 504 and to write the state data of the second sample to first stack level 502. The state data of the second sample overwrites the state data of the first and fourth samples in first stack level 502. Again, pushing the state data of the second sample onto global stack 500 removes the second sample from working set of data 510.

In addition, remap 250 is configured to generate a PC token that includes the codewords to configure the various programmable computation units of recirculating shader pipeline 200 to execute the call operations specified in Call/Return D. Finally, remap 250 is configured to dispatch the PC token into the pipeline, followed by the first, second, third and fourth samples of group A. As the first, second and fourth samples of group A are encoded with non-op information, these samples are simply "along for the ride."

After the call operations specified in Call/Return D are executed on the third sample, remap 250 is configured to cause the return operations specified in Call/Return D to be executed on the third sample of group A and the return operations specified in Call/Return C to be executed on the second and third samples of group A. More specifically, after all of the call operations in call-return path 412 have been executed, remap 250 is configured first to identify from subroutine depth scoreboard 520 the samples in group A that have the greatest subroutine depth. At this juncture in program flow 400, the first and fourth samples have SDs equal to zero, the second sample has an SD equal to one and the third sample has an SD equal to two. The third sample thus has the greatest SD, indicating that the return operations specified in Call/Return D are to be executed on only the third sample.

Remap 250 is configured then to hold "idle" the first, second and fourth samples. Again, remap 250 is configured to encode the first, second and fourth samples with no-op information such that the various programmable computation units in recirculating shader pipeline 200 do not perform any operations on those samples. In addition, remap 250 is configured to generate a PC token that includes the codewords to configure the various programmable computation units of recirculating shader pipeline 200 to execute the return operations specified in Call/Return D. Finally, remap 250 is configured to dispatch the PC token into the pipeline, followed by the first, second, third and fourth samples of group A. As the first, second and fourth samples of group A are encoded with non-op information, these samples are simply "along for the ride."

After the return operations specified in Call/Return D have been executed on the third sample, remap 250 is configured to decrement the SD of the third sample in subroutine depth scoreboard 520, giving the third sample an SD equal to one. Remap 250 is further configured to pop the state data out of first stack level 502 of global stack 500, restoring the sample(s) related to that state data (i.e., the second sampled group A) to working set of data 510. Remap 250 also is configured to write the state data residing in second stack level 504 (i.e., the state data of the first and fourth samples) to first stack level 502. The state data of the first and fourth samples overwrites the state data of the second sample in first stack level 502.

After popping the state data from first stack level 502, remap 250 is configured again to identify from subroutine depth scoreboard 520 the samples in group A having the greatest subroutine depth. At this juncture in program flow 400, the first and fourth samples have SDs equal to zero, and the second and third samples have SDs equal to one. The second and third samples thus have the greatest SD, indicating that the return operations specified in Call/Return C are to be executed on both the second and third samples.

Remap 250 is configured then to hold "idle" the first and fourth samples. Again, remap 250 is configured to encode the first and fourth samples with non-op information such that the various programmable computation units in recirculating shader pipeline 200 do not perform any operations on those samples. In addition, remap 250 is configured to generate a PC token that includes the codewords to configure the various programmable computation units of recirculating shader pipeline 200 to execute the return operations specified in Call/Return C. Finally, remap 250 is configured to dispatch the PC token into the pipeline, followed by the first, second, third and fourth samples of group A. As the first and fourth samples of group A are encoded with non-op information, these samples are simply "along for the ride."

After the return operations specified in Call/Return C have been executed on the second and third samples, remap 250 is configured to decrement the SDs of the second and third samples in subroutine depth scoreboard 520, giving the second and third samples SDs equal to zero. Remap 250 also is configured to pop the state data out of the first stack level 502 of global stack 500, restoring the sample(s) related to that state data (i.e., the second and third samples of group A) to working set of data 510.

At this juncture in program flow 400, each of the first, second, third and fourth samples of group A has an SD equal to zero, indicating that the samples have become non-divergent. The disclosed system may therefore continue to process the samples of group A in a manner consistent with a SIMD architecture beginning with instruction 410, which is the next instruction in program flow 400. As described above in conjunction with FIG. 3, remap 250 is configured to generate a PC token to cause the programmable computation units in recirculating shader pipeline 200 to execute the operations specified in instruction 410 (corresponding to Inst E of instruction sequence 306) on all of the samples of group A.

Figure 6A:
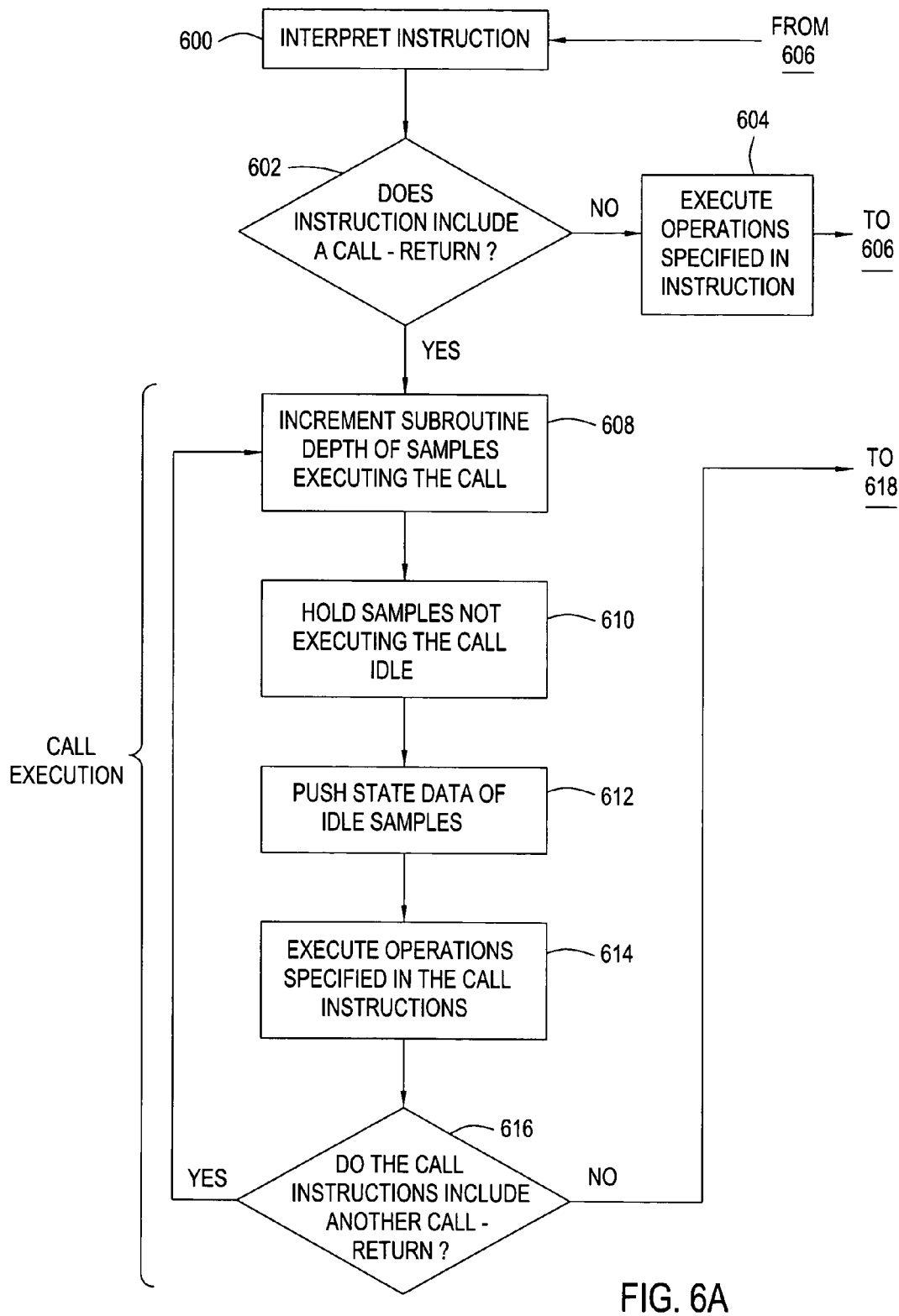
FIGS. 6A and 6B are a flow chart of method steps for processing one or more divergent samples, according to one embodiment of the invention.
Figure 6B:
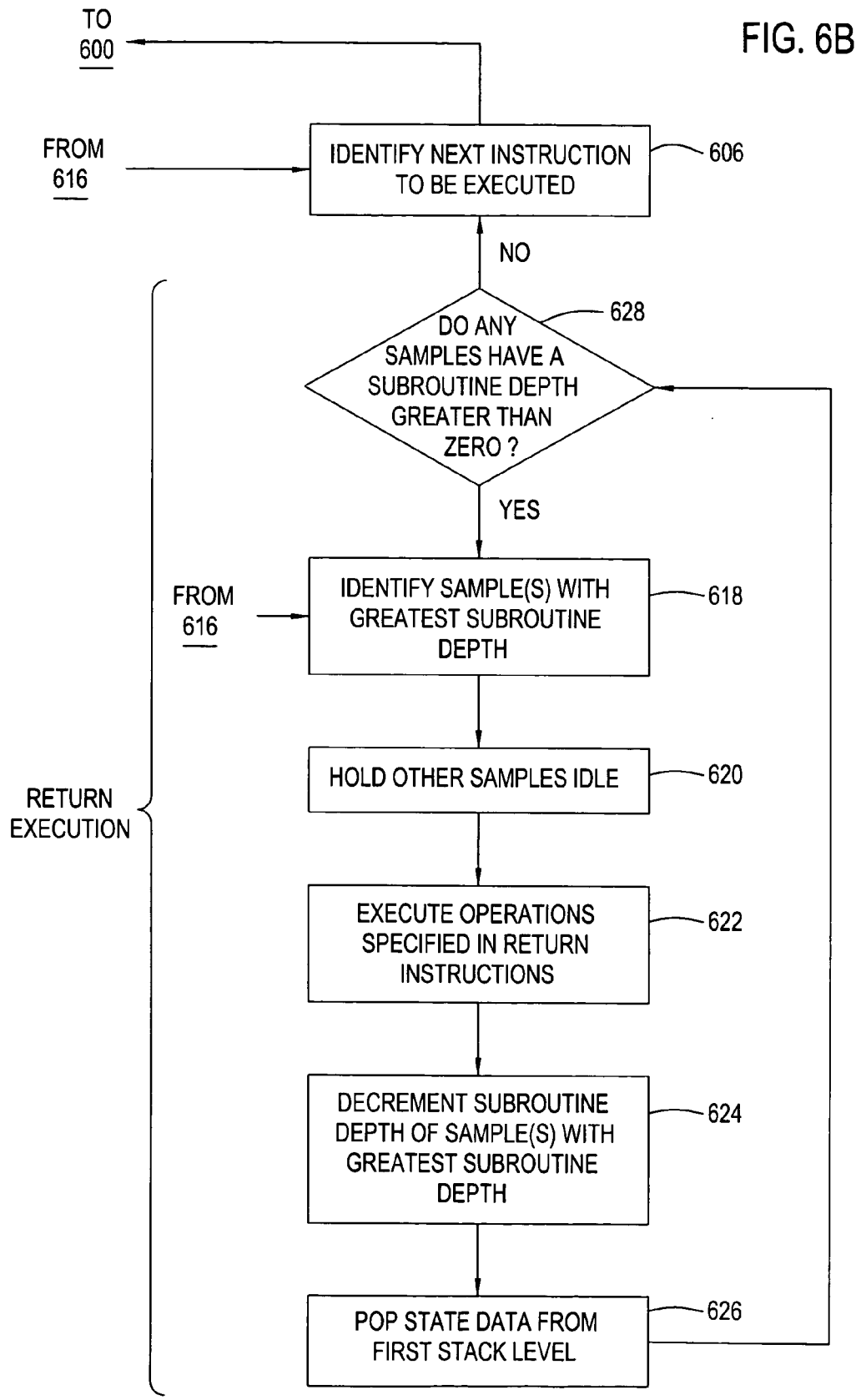

FIGS. 6A and 6B are a flow chart of method steps for processing one or more divergent samples, according to one embodiment of the invention. Although the method steps are described in the context of the systems illustrated in FIGS. 1-5, any system configured to perform the method steps in any order is within the scope of the invention. This description assumes for illustrative purposes only that the operations specified in an instruction sequence are executed on a group of samples in recirculating shader pipeline 200 of FIG. 2 using a PC token. This description also assumes that one or more samples in the group have diverged, via a call-return or the like, as previously described herein.

As shown in FIGS. 6A and 6B, the method of tracking the divergence starts in step 600 where remap 250 interprets the current instruction in the instruction sequence. In one embodiment, remap 250 performs this interpretation step while converting the instruction to one or more codewords. In step 602, remap 250 determines whether the instruction includes a call-return. If the instruction does not include a call-return, then the method proceeds to step 604, where the operations specified in the instruction are executed on all of the samples of the group, consistent with a SIMD architecture. In one embodiment, remap 250 generates a PC token that includes the codewords that configure the various programmable computation units in recirculating shader pipeline 200 to execute those operations. Remap 250 then dispatches the PC token into the pipeline, followed by the samples of the group. In step 606, remap 250 identifies the next instruction to be executed in the instruction sequence and the method returns to step 600.

If, however, the instruction does include a call-return, then the method proceeds to step 608. In step 608, remap 250 determines the samples upon which the operations specified in the call instructions of the call-return are to be executed and then increments the SD of each such sample. In one embodiment, subroutine depth scoreboard 520 enables remap 250 to track the SDs of each sample of the group. To the extent that remap 250 determines that the operations specified in the call instructions are to be executed on only a subset of the group, a divergence occurs.

In step 610, remap 250 holds "idle" each sample of the group upon which the operations specified in the call instructions are not to be executed. In one embodiment, remap 250 encodes each such sample with non-op information indicating that the various programmable computation units in recirculating shader pipeline 200 should not perform any operations on those samples. In step 612, remap 250 pushes the state data of the idle samples onto first stack level 502 of global stack 500, removing the idle samples from working set of data 510. To the extent that first stack level 502 already contains state information, remap 250 pushes that state information down to second stack level 504. Remap 250 continues the process of pushing state data already contained in each level of global stack 500 down to the next level down in global stack 500 until all state information in global stack 500 has been pushed down one level.

In step 614, the operations specified in the call instructions of the call-return are executed on the non-idle samples, which are the samples with the greatest SD. In one embodiment, remap 250 generates a PC token that includes the codewords that configure the various programmable computation units in recirculating shader pipeline 200 to execute those operations. Remap 250 then dispatches the PC token into the pipeline, followed by the samples of the group. The operations specified in the call instructions are then executed on the non-idle samples, and the idle samples are "along for the ride."

In step 616, remap 250 determines whether the call instructions of the call-return include another call-return. If the call instructions do include another call-return, then the method returns to step 608. If, however, the call instructions do not include another call-return, then the method proceeds to step 618.

In step 618, remap 250 identifies which samples of the group have the greatest SD. Again, in one embodiment, subroutine depth scoreboard 520 enables remap 250 to track the SDs of each sample of the group. In step 620, remap 250 holds "idle" the other samples in the group. Again, in one embodiment, remap 250 encodes each idle sample with non-op information, as previously described herein. In step 622, the operations specified in the return instructions of the call-return with a nesting level corresponding to the SD of the samples of the group having the greatest SD are executed on the samples having the greatest SD (i.e., the non-idle samples). Again, in one embodiment, remap 250 generates a PC token that includes the codewords that configure the various programmable computation units in recirculating shader pipeline 200 to execute those operations. Remap 250 then dispatches the PC token into the pipeline, followed by the samples of the group. The operations specified in the return instructions are then executed on the non-idle samples, and the idle samples are "along for the ride."

In step 624, remap 250 decrements the SD of the samples of the group having the greatest SD. In step 626, remap 250 pops the state data out of first stack level 502 of global stack 500, restoring the sample(s) related to that state data to working set of data 510. To the extent that second stack level 504 also contains state information, remap 250 pops that state information up to first stack level 504. Remap 250 continues the process of popping state data already contained in each level of global stack 500 up to the next level in global stack 500 until all state information in global stack 500 has been popped up one level. In step 628, remap 250 determines whether any sample of the group has a SD greater than zero. If at least one sample has a SD greater than zero, then the method returns to step 618. If, however, each sample of the group has a SD equal to zero, then the samples have become non-divergent, and the method returns to step 606.

Again, persons skilled in the art will understand that the system of FIGS. 1 and 2 is simply one embodiment of a system that may be configured to perform the method steps of FIGS. 6A and 6B. Therefore, as previously stated herein, persons skilled in the art will appreciate that any system configured to perform the method steps of FIGS. 6A and 6B, or their equivalents, is within the scope of the present invention.

Figure 7:
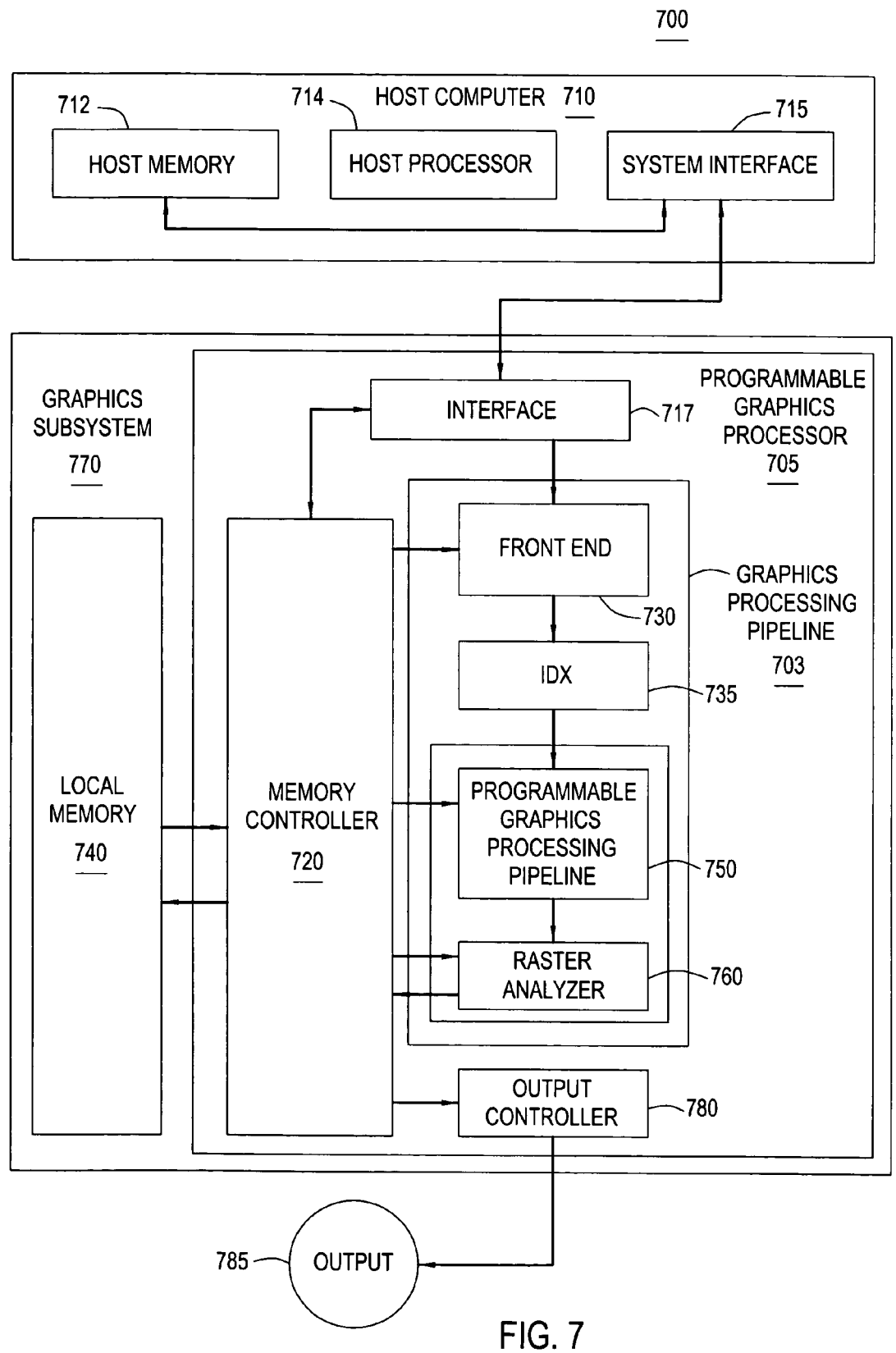
FIG. 7 is a block diagram illustrating a computing system, according to another embodiment of the invention.

FIG. 7 is a block diagram illustrating a computing system 700, according to another embodiment of the invention. As shown, computer system 700 may include, without limitation, a host computer 710 and a graphics subsystem 770. Computing system 700 may be a desktop computer, server, laptop computer, palm-sized computer, tablet computer, game console, cellular telephone, computer based simulator or the like. Host computer 710 includes a host processor 714, which may include a system memory controller to interface directly to a host memory 712 or may communicate with host memory 712 through a system interface 715. System interface 715 may be an input/output (I/O) interface or a bridge device including the system memory controller to interface directly to host memory 712. Examples of system interface 715 known in the art include Intel® Northbridge and Intel® Southbridge.

Host computer 710 communicates with graphics subsystem 770 via system interface 715 and an interface 717. Graphics subsystem 770 includes a local memory 740 and a programmable graphics processor 705. Data received at interface 717 can be passed to a front end 730 or written to local memory 740 through a memory controller 720. Programmable graphics processor 705 uses graphics memory to store graphics data and program instructions, where graphics data is any data that is input to or output from computation units within programmable graphics processor 705. Graphics memory can include portions of host memory 712, local memory 740 directly coupled to programmable graphics processor 705, register files coupled to the computation units within programmable graphics processor 705 and the like.

Graphics processing pipeline 703 may include, without limitation, front end 730 that receives commands from host computer 710 via interface 717. Front end 730 interprets and formats the commands and outputs the formatted commands and data to an IDX (Index Processor) 735. Some of the formatted commands are used by programmable graphics processing pipeline 750 to initiate processing of data by providing the location of program instructions or graphics data stored in memory. Each of IDX 735, programmable graphics processing pipeline 750 and a raster analyzer 760 includes an interface to memory controller 720 through which program instructions and data can be read from memory, e.g., any combination of local memory 740 and host memory 712. When a portion of host memory 712 is used to store program instructions and data, that portion of host memory 712 can be uncached, increasing the access performance of graphics processor 705.

IDX 735 optionally reads processed data, e.g., data written by raster analyzer 760, from memory and outputs the data, processed data and formatted commands to programmable graphics processing pipeline 750. Each of programmable graphics processing pipeline 750 and raster analyzer 760 includes one or more programmable processing units for performing a variety of specialized functions. Such functions, without limitation, include table lookup, scalar and vector addition, multiplication, division, coordinate-system mapping, calculation of vector normals, tessellation, calculation of derivatives, interpolation and the like. Programmable graphics processing pipeline 750 and raster analyzer 760 are each optionally configured such that data processing operations are performed in multiple passes through those units or in multiple passes within programmable graphics processing pipeline 750. Each of programmable graphics processing pipeline 750 and raster analyzer 760 also includes a write interface to memory controller 720 through which data can be written to memory.

In a typical implementation, programmable graphics processing pipeline 750 performs geometry computations, rasterization and pixel computations. Therefore programmable graphics processing pipeline 750 may thus be programmed to operate on surface, primitive, vertex, fragment, pixel, sample or any other data. Again, for simplicity, the term "samples" is hereinafter used to refer to surfaces, primitives, vertices, pixels or fragments of the like.

Samples output by programmable graphics processing pipeline 750 are passed to a raster analyzer 760, which optionally performs near and far plane clipping and raster operations, such as stencil, z test and the like, and saves the results or the samples output by programmable graphics processing pipeline 750 in local memory 740. When the data received by graphics subsystem 770 has been completely processed by graphics processor 705, an output 785 of graphics subsystem 770 is provided using an output controller 780. Output controller 780 is optionally configured to deliver data to a display device, network, electronic control system, other computing systems 700, other graphics subsystems 770 or the like.

Figure 8:
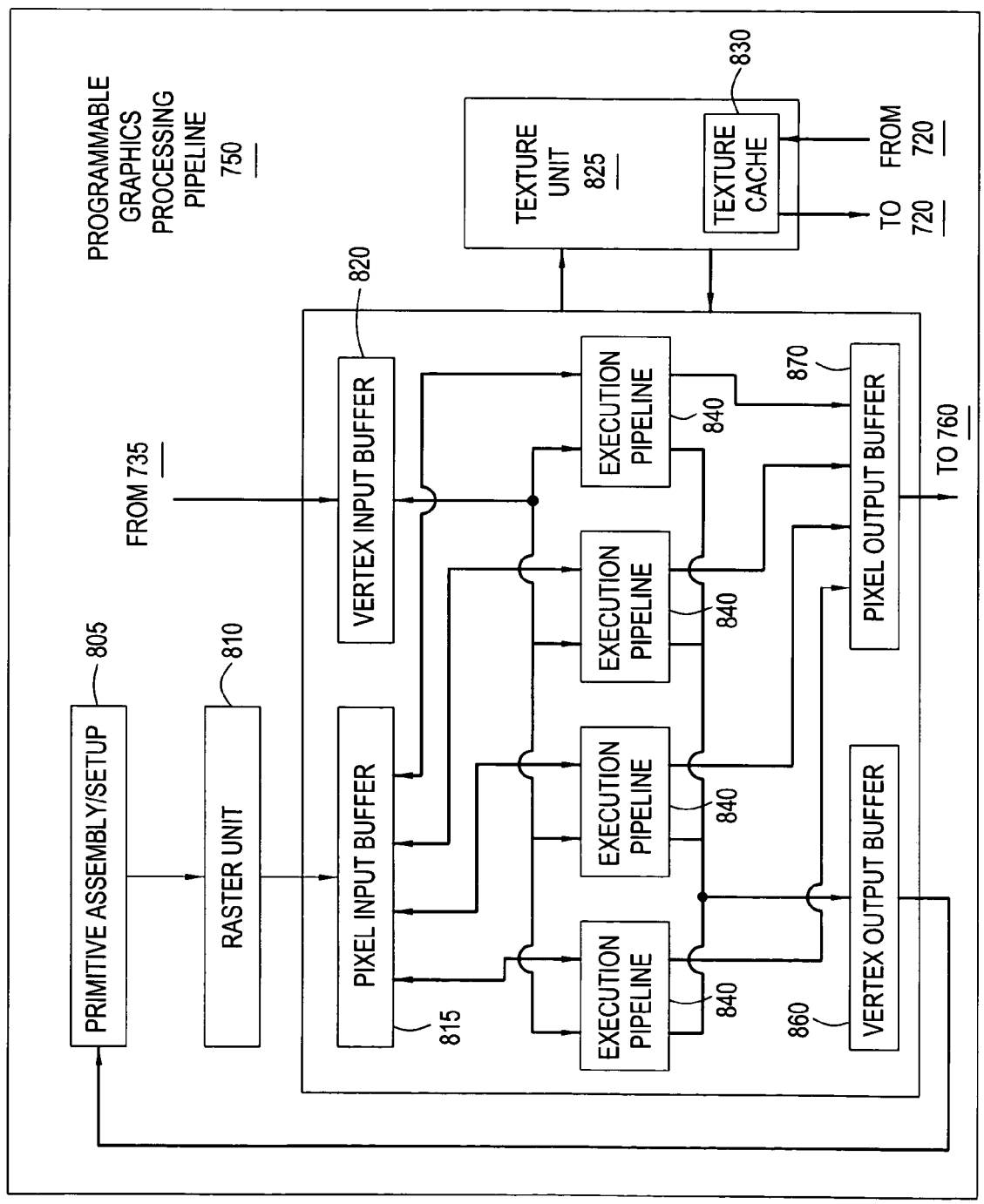
FIG. 8 is a block diagram illustrating the programmable graphics processing pipeline of FIG. 7, according to one embodiment of the invention.

FIG. 8 is a block diagram illustrating programmable graphics processing pipeline 750 of FIG. 7, according to one embodiment of the invention. At least one set of samples is output by IDX 735 and received by programmable graphics processing pipeline 750. The samples are then processed according to at least one program that includes graphics program instructions. A program can process one or more sets of samples. Conversely, a set of samples can be processed by a sequence of one or more programs.

The samples received from IDX 735 by programmable graphics processing pipeline 750 are stored in a vertex input Buffer 820 in a register file, FIFO (first-in first-out) stack, cache or the like. The samples are broadcast to one or more execution pipelines 840, each on which includes at least one multithreaded processing unit. The samples output by vertex input buffer 820 can be processed by any one of the execution pipelines 840. As described in further detail herein, a sample is accepted by execution pipeline 840 when a processing thread within execution pipeline 840 is available. Each execution pipeline 840 signals to vertex input buffer 820 when a processing thread is available, thereby indicating that a sample can be accepted. In one embodiment, programmable graphics processing pipeline 750 includes a single execution pipeline 840 containing one multithreaded processing unit. In an alternative embodiment, programmable graphics processing pipeline 750 may include a plurality of execution pipelines 840.

Execution pipeline 840 can receive first samples, such as higher-order surface data, and tessellate the first samples to generate second samples, such as vertices. Execution pipeline 840 can be configured to transform the second samples from an object-based coordinate representation (object space) to an alternatively based coordinate system such as world space or normalized device coordinates (NDC) space. In one embodiment, each execution pipeline 840 communicates with texture unit 825 using a read interface (not shown) to read program instructions and graphics data such as texture maps from local memory 740 or host memory 712 via memory controller 720 and a texture cache 830. Texture cache 830 is used to improve memory read performance by reducing read latency, but may be omitted in an alternative embodiment. In another alternate embodiment, texture unit 825 may be included in each execution pipeline 840. In yet another alternative embodiment, a separate instruction fetch path may be used by each execution pipeline 840 to retrieve program instructions and graphics data. Persons skilled in the art will recognize that the manner in which execution pipeline 840 retrieve program instructions and graphics data in no way limits the scope of the present invention.

Execution pipelines 840 output processed samples, such as vertices, that are stored in a vertex output buffer 860 in a register file, FIFO, cache or the like. Processed vertices output by vertex output buffer 860 are received by a primitive assembly/setup 805, which calculates parameters, such as deltas and slopes, to rasterize the processed vertices. Primitive assembly/setup 805 outputs parameters and samples, such as vertices, to a raster unit 810, which performs scan conversion on samples, such as vertices, and outputs samples, such as fragments, to a pixel input buffer 815. Alternatively, raster unit 810 resamples processed vertices and outputs additional vertices to pixel input buffer 815.

Pixel input buffer 815 outputs the samples to each execution pipeline 840. Each samples output by pixel input buffer 815 is processed by only one execution pipelines 840. Pixel input buffer 815 determines to which one of execution pipelines 840 to output a particular sample based on an output pixel position, e.g., (x, y), associated with that sample. Thus, each sample may be output to execution pipeline 840 designated to process samples associated with a given output pixel position. In an alternate embodiment, each sample output by pixel input buffer 815 may be processed by an available execution pipeline 840.

As previously mentioned herein, a sample is accepted by execution pipeline 840 when a processing thread within execution pipeline 840 is available. Program instructions associated with a thread configure programmable computation units within execution pipeline 840 to perform operations such as texture mapping, shading, blending and the like. Processed samples are output from each execution pipeline 840 to a pixel output buffer 870. Pixel output buffer 870 optionally stores the processed samples in a register file, FIFO, cache or the like. The processed samples are output from pixel output buffer 870 to raster analyzer 760.

In one embodiment, execution pipelines 840 are optionally configured using program instructions read by texture unit 825 such that data processing operations are performed in multiple passes through at least one multithreaded processing unit disposed within execution pipelines 840. Intermediate data generated during multiple passes can be stored in graphics memory. Again, the manner in which execution pipeline 840 retrieves program instructions in no way limits the scope of the present invention.

One characteristic of the system disclosed in FIGS. 7 and 8 is that it embodies a multiple-instruction, multiple-data ("MIMD") architecture. Accordingly, the programmable computation units within the one or more execution pipelines 840 may be configured to independently execute the same or different operations on different samples associated with a given graphics primitive simultaneously. As described in further detail herein, through the use of processing threads assigned to each sample of a group of samples processed in the one or more execution pipelines 840, a separate PC is assigned to each such sample to enable this functionality.

Figure 9:
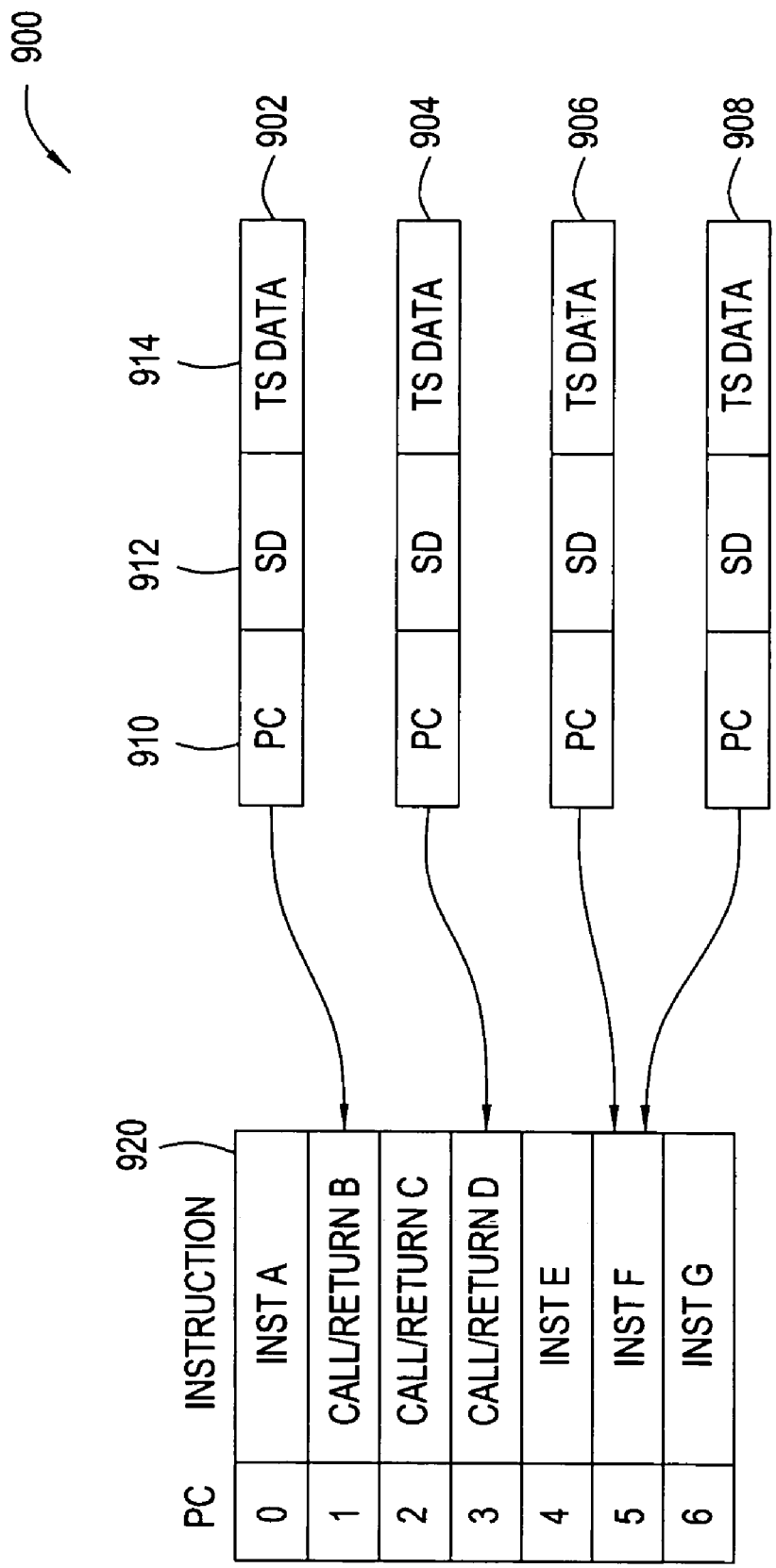
FIG. 9 is a conceptual diagram illustrating a plurality of processing threads, according to one embodiment of the invention.

FIG. 9 is a conceptual diagram illustrating a plurality of processing threads 900, according to one embodiment of the invention. As shown, plurality of processing threads 900 may include, without limitation, a first thread 902, a second thread 904, a third thread 906 and a fourth thread 908. Each such thread comprises a data structure that may be configured to cause the various programmable computation units in execution pipeline 840 to execute one or more instructions of an instruction sequence from a fragment program on a given sample. As persons skilled in the art will understand, the configuration of each of first thread 902, second thread 904, third thread 906 and fourth thread 908 is generally the same. For this reason, the configuration of only first thread 902 is described herein.

First thread 902 may include, without limitation, a PC 910, an SD 912 and a thread state ("TS") data field 914. PC 910 specifies the location of one or more instructions of instruction sequence 920 that are executed on a given sample. Such a location may be in, for example, graphics memory or a local storage resource within execution pipeline 840, e.g., a cache, a register file or the like. PC 910 may be a physical address in the graphics memory, an index to a location in a local storage resource that contains a physical memory address or the one or more instructions, an offset from a value in a register that contains a physical memory address or the one or more instructions, or the like. As described above in conjunction with FIGS. 4-6, SD 912 specifies the nesting level of any call-return instructions in instruction sequence 920 that are executed on a given sample. TS data field 914 is configured to store thread state data, which may include any type of information related to processing a given sample in execution pipeline 840. For example, thread state data may include a pointer to a sample, the sample type (e.g., pixel, fragment, vertex, primitive and the like) of a sample, a pointer specifying the destination location of a processed sample, a pointer to the output pixel or fragment position of a processed sample and the like.

As also shown in FIG. 9, each of the one or more instructions in instruction sequence 920 has a corresponding PC. In one embodiment, the PCs are numbered sequentially such that the PCs may be used as an index to locate a specific program instruction within instruction sequence 920. For example, Inst A is the first instruction in instruction sequence 920 and corresponds to a PC equal to zero. Call/Return B is the second instruction in instruction sequence 920 and corresponds to a PC equal to one. Inst F is the sixth instruction in instruction sequence 920 and corresponds to a PC equal to five. As persons skilled in the art will understand, a base address corresponding to the graphics memory location where the first instruction in instruction sequence 920 is stored may be used in conjunction with a given PC to determine the graphics memory location where the instruction in instruction sequence 920 corresponding to that PC is stored.

When a group of four samples (such as group A defined in FIG. 3) are processed by execution pipeline 840, each of first thread 902, second thread 904, third thread 906 and fourth thread 908 is assigned to a different one of the four samples. Each of first thread 902, second thread 904, third thread 906 and fourth thread 908 also is uniquely identified by a thread identification code. One or more program instructions within instruction sequence 920 is associated with a given processing thread by including the PC corresponding to the one or more instructions in the thread. For example, if Call/Return C is associated with first thread 902, then PC 910 is equal to one. Likewise, if Inst E is associated with first thread 902, then PC 910 is equal to four.

When processing a particular sample in execution pipeline 840, the processing thread assigned to that sample passes through execution pipeline 840. The programmable computation units in execution pipeline 840 are configured to execute on the sample the operations specified in the one or more instructions corresponding to the PC specified in the processing thread. Importantly, since a given processing thread corresponds to only one sample at a time, each sample of a group of samples processed in execution pipeline 840 has a separate PC. For this reason, different instructions corresponding to different PCs may be executed on the samples of a group of samples during a single pass through execution pipeline 840, thereby providing the system of FIGS. 7 and 8 with MIMD capability.

By contrast, a given PC token (described above in conjunction with FIG. 3) corresponds to a group of samples. Thus, each sample in the group processed in recirculating shader pipeline 200 has the same PC. For this reason, only the instruction(s) corresponding to that particular PC may be executed on a group of samples during a single pass through recirculating shader pipeline 200, thereby providing the system of FIGS. 1 and 2 with only SIMD capability.

Figure 10:
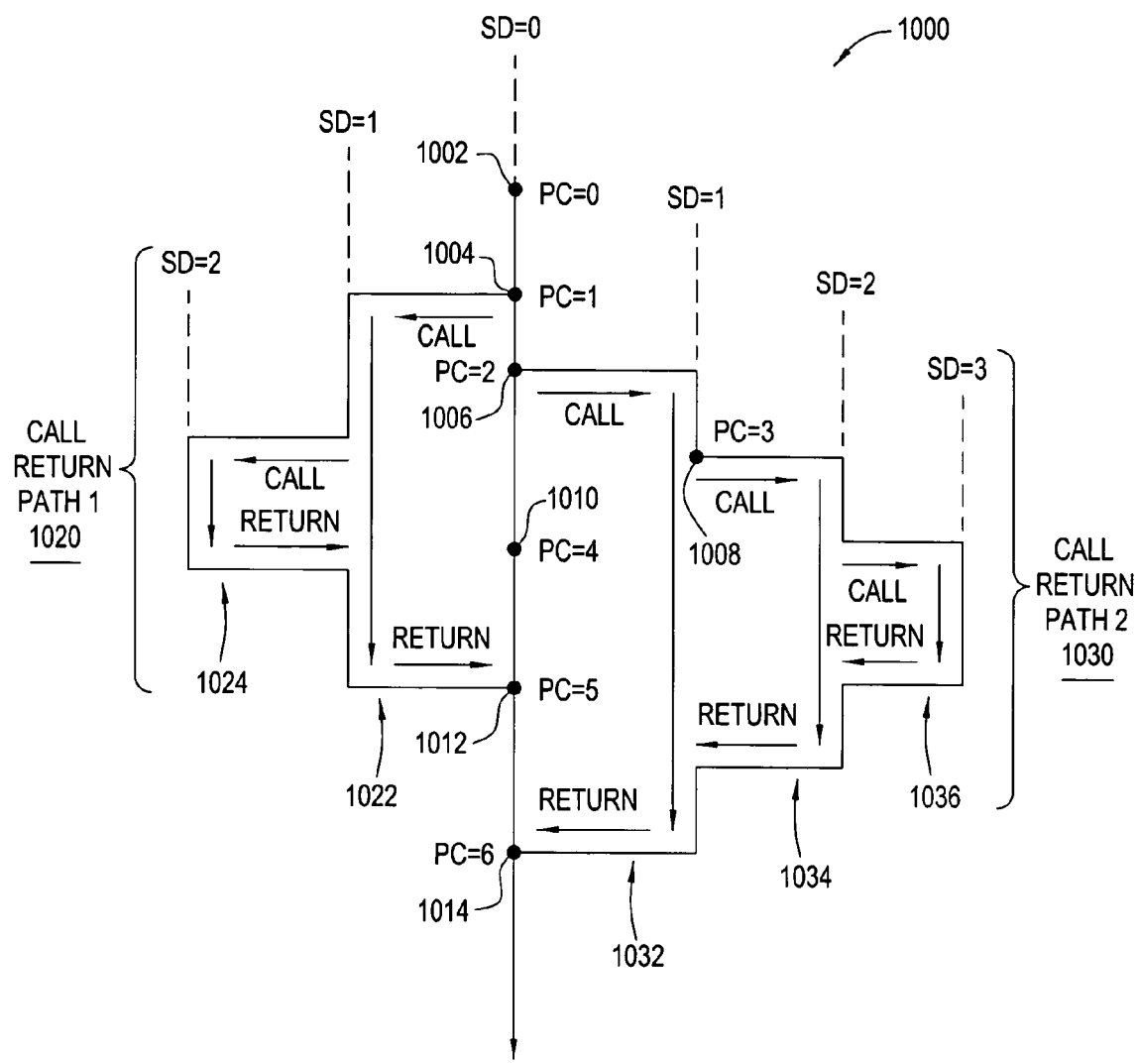
FIG. 10 is a conceptual diagram illustrating a program flow corresponding to the one or more instructions of the instruction sequence of FIG. 9, according to one embodiment of the invention.

FIG. 10 is a conceptual diagram illustrating a program flow 1000 corresponding to the one or more instructions of instruction sequence 920 of FIG. 9, according to one embodiment of the invention. As shown, program flow 1000 includes an instruction 1002, which corresponds to Inst A of instruction sequence 920, an instruction 1004, which corresponds to Call/Return B of instruction sequence 920, an instruction 1006, which corresponds to Call/Return C of instruction sequence 920, an instruction 1008, which corresponds to Call/Return D of instruction sequence 920, an instruction 1010, which corresponds to Inst E of instruction sequence 920, an instruction 1012, which corresponds to Inst F of instruction sequence 920, and an instruction 1014, which corresponds to Inst G of instruction sequence 920. As also shown, program flow 1000 includes a call-return path 1020, comprising a first call-return 1022, corresponding to instruction 1004, and a second call-return 1024. Program flow 1000 also includes a call-return path 1030, comprising a third call-return 1032, corresponding to instruction 1006, a fourth call-return 1034, corresponding to instruction 1008, and a fifth call-return 1036. As persons skilled in the art will recognize, each of first call-return 1022, second call-return 1024, third call-return 1032, fourth call-return 1034 and fifth call-return 1036 may correspond, for example, with a different subroutine of a particular fragment program.

As described above in conjunction with FIG. 9, an SD is associated with each nesting level of the call-returns that comprise a given call-return path in program flow 1000. For example, as shown in FIG. 10, first call-return 1022 resides in the first nesting level of call-return path 1020. The SD associated with first call-return 1022 therefore has a value of 1. Second call-return 1024 resides in the second nesting level of call-return path 1020, indicating that second call-return 1024 is nested within first call-return 1022. The SD associated with second call-return 1022 therefore has a value of 2. Similarly, third call-return 1032 resides in the first nesting level of call-return path 1030. The SD associated with third call-return 1032 therefore has a value of 1. Fourth call-return 1034 resides in the second nesting level of call-return path 1030, indicating that fourth call-return 1034 is nested within third call-return 1032. The SD associated with fourth call-return 1034 therefore has a value of 2. Fifth call-return 1036 resides in the third nesting level of call-return path 1030, indicating that fifth call-return 1036 is nested within fourth call-return 1034. The SD associated with fifth call-return 1036 therefore has a value of 3. By contrast, instructions 1002, 1010, 1012 and 1014 doe not include any call-return instructions. For this reason, the SD associated with these instructions has a value of 0.

As previously described herein, when the four samples of group A are processed in execution pipeline 840, a processing thread is assigned to each of the four samples. Further, each multithreaded processing unit within execution pipeline 840 is configured to support multithreaded execution. A given multithreaded processing unit therefore may process one or more of the samples of group A asynchronously relative to the other samples, meaning that the multithreaded processing unit may execute the various instructions in instruction sequence 920 on the samples of group A at different times or in different orders. For example, the multithreaded processing unit may perform the operations specified in Call/Return C and Call/Return D (corresponding to instructions 1006 and 1008, respectively) on the first and third samples of group A and the operations specified in Inst E (corresponding to instruction 1010) on the second and fourth samples. Similarly, the multithreaded processing unit may perform the operations specified in Inst F (corresponding to instruction 1012) on the second sample, then the third sample, then the first sample and then the fourth sample. In addition, to the extent that one or more instructions in instruction sequence 920 are associated with a conditional branch or a jump (not shown in FIG. 10), the multithreaded processing unit may perform the operations specified in those instructions on one or more samples of group A and the operations specified in instructions depicted in program flow 1000 on the other samples of group A. Again, the fact that each thread (and therefore each sample in group A) has a separate PC provides the multithreaded processing unit with this capability.

As described above in conjunction with FIG. 4, a divergence occurs any time that operations specified in an instruction are performed one or more samples of group A, but not on the other samples of group A. With respect to the system of FIGS. 7 and 8, if the threads assigned to the samples of group A have either different PCs or different SDs signals, then a divergence has occurred since, in each situation, different instructions are executed on the samples of group A. More specifically, if the PCs corresponding to the samples are different, then the divergence may be associated with a conditional branch, a jump or the like. If the SDs corresponding to the samples are different, then the divergence may be associated with a call-return or the like. Although the MIMD architecture of the system of FIGS. 7 and 8 enables different instructions to be executed on different samples, since each sample has a corresponding PC, oftentimes such a mode of operation (referred to as "divergent mode" or "MIMD mode") is not preferred because the efficiencies of synchronous processing (referred to as "non-divergent" or "SIMD mode") are lost. For example, LOD and derivative calculations typically are performed on a group of four samples from the same primitive, so these samples should be processed synchronously when LOD and derivative calculations are performed.

As described in further detail below in conjunction with FIG. 12, however, a fragment program may be structured to include one or more "synch tokens" in various locations where operating in non-divergent mode is preferred. A synch token may be an instruction to perform synchronization before proceeding to the next instruction in the program flow or an instruction with a bit set to signal that a synchronization should occur before executing that instruction. For example, referring again to FIG. 10, assume that the samples of group A have diverged along program flow 1000 such that the operations specified in Call/Return D (corresponding to instruction 1008) are executed on the first and third samples of group A, and the operations specified in Inst F (corresponding to instruction 1012) are executed on the second and fourth samples. Assume also that program flow 1000 is structured such that operating in non-divergent mode at instruction 1014 is preferred. In such a case, Inst G of instruction sequence 920 may include a synch token to signal that a synchronization should occur before the operations specified in Inst G are executed on any of the samples of group A. The system of FIGS. 7 and 8 may be configured to hold idle each sample of group A that reaches instruction 1014 until all of the samples reach instruction 1014. Once all of the samples of group A have reached instruction 1014, and the system is configured to determine whether the samples are synchronized and, if they are, to process the samples in non-divergent mode, synchronously executing execute the operations specified in Inst G on each of the samples. In the event that the samples are not synchronized (or if synchronization takes too long), the disclosed system may be configured to terminate the synchronization process.

Figure 11:
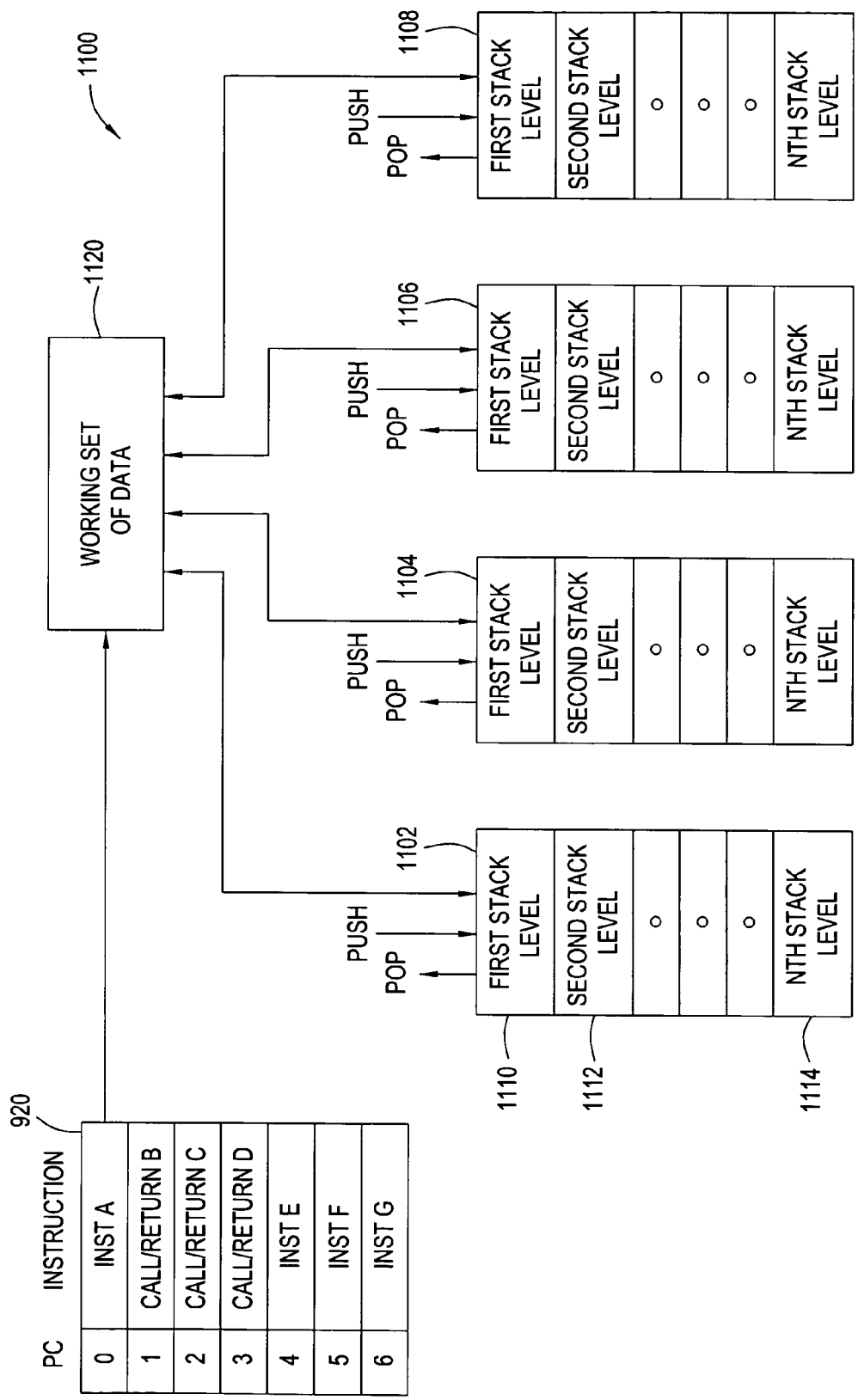
FIG. 11 is a conceptual diagram of a set of stacks used to track the divergence of one or more samples in the program flow of FIG. 10, according to one embodiment of the invention.

FIG. 11 is a conceptual diagram of a set of stacks 1100 used to track the divergence of one or more samples in program flow 1000 of FIG. 10, according to one embodiment of the invention. As shown, set of stacks 1100 may include, without limitation, a first stack 1102, a second stack 1104, a third stack 1106 and a fourth stack 1108. In one embodiment, each of first stack 1102, second stack 1104, third stack 1106 and fourth stack 1108 corresponds to a different sample processed in execution pipeline 840. In an alternative embodiment, one or more stacks in set of stacks 1100 may correspond to two or more samples processed in execution pipeline 840.

Each stack in set of stacks 1100 resides in the graphics memory. For example, in one embodiment, each stack may be stored in a dedicated local storage resource located within execution pipeline 840. In an alternative embodiment, a first portion of each stack may be stored in the dedicated local storage resource, and a second portion of each stack may be stored in local memory 740. As persons skilled in the art will recognize, the configuration of each of first stack 1102, second stack 1104, third stack 1106 and fourth stack 1108 is generally the same. For this reason, only the configuration of first stack 1102 is described herein.

First stack 1102 comprises a data structure that may include any arbitrary number of stack levels as represented by a first stack level 1110, a second stack level 1112 and continuing up to and including Nth stack level 1114. Each stack level is configured to store state data, which may be any type of information related to processing a sample in execution pipeline 840, as previously described herein. For purposes of illustration only, assume that the first sample in group A corresponds to first stack 1102.

As described above in conjunction with FIGS. 5 and 6A/6B, each time call instructions of a call-return are executed on the first sample, state data related to that sample is pushed onto first stack level 1110 of first stack 1102 before the call instructions are executed. The pushed state data may correspond to any data related to the first sample upon which the call instructions should not be executed. As previously described, pushing state data onto first stack 1102 removes the corresponding data related to the first sample from working set of data 1120, which includes all sample data upon which operations are performed in execution pipeline 840. To the extent that first stack level 1110 already contains state information, that state information is pushed down to a second stack level 1112. The process of pushing state data already contained in each level of first stack 1102 down to the next level of first stack 1102 continues until all state information in first stack 1102 has been pushed down one level.

Similarly, as also described above in conjunction with FIGS. 5 and 6A/6B, each time return instructions of a call-return are executed on the first sample, state data related to that sample is popped from first stack level 1110 of first stack 1102 after the return instructions are executed. Again, as previously described, popping state data from first stack 1102 restores the corresponding data related to the first sample to working set of data 1120. To the extent that second stack level 1112 also contains state information, that state information is popped up to first stack level 1110. The process of popping state data already contained in each level of first stack 1102 up to the next level in first stack 1102 continues until all state information contained in first stack 1102 has been popped up one level.

As persons skilled in the art will recognize, since state data is pushed onto first stack 1102 before executing call instructions and popped from stack 1102 after executing return instructions, the SD of the first sample is always the same as the number of stack levels of first stack 1102 that contain state data. For example, suppose that the operations specified in call instructions of Call/Return D (corresponding to instruction 1008 in program flow 1000) are to be executed on the first sample. Since call-return 1034 resides in the second nesting level of call-return path 1030, the first sample has an SD of two. This corresponds with the number of stack levels in first stack 1102 that contain state information. More specifically, second stack level 1112 contains state data pushed onto first stack 1102 prior to executing the call instructions included in Call/Return C, and first stack level 1110 contains state data pushed onto first stack 1102 prior to executing the call instructions included in Call/Return D. As the foregoing shows, the SD of a sample processed in execution pipeline 840 in accordance with program flow 1000 may be determined from the number of stack levels in the corresponding stack that contain state data.

As previously described herein, the PC of the processing thread corresponding to a given sample indicates the one or more instructions in instruction sequence 920 that are scheduled to be executed on that sample. Further, the SD of the sample indicates the nesting level any call-return instructions in instruction sequence 920 that are scheduled to be executed on the sample. Thus, the PC and the SD may be used to track the location in program flow 1000 of any sample being processed in execution pipeline 840.

Figure 12:
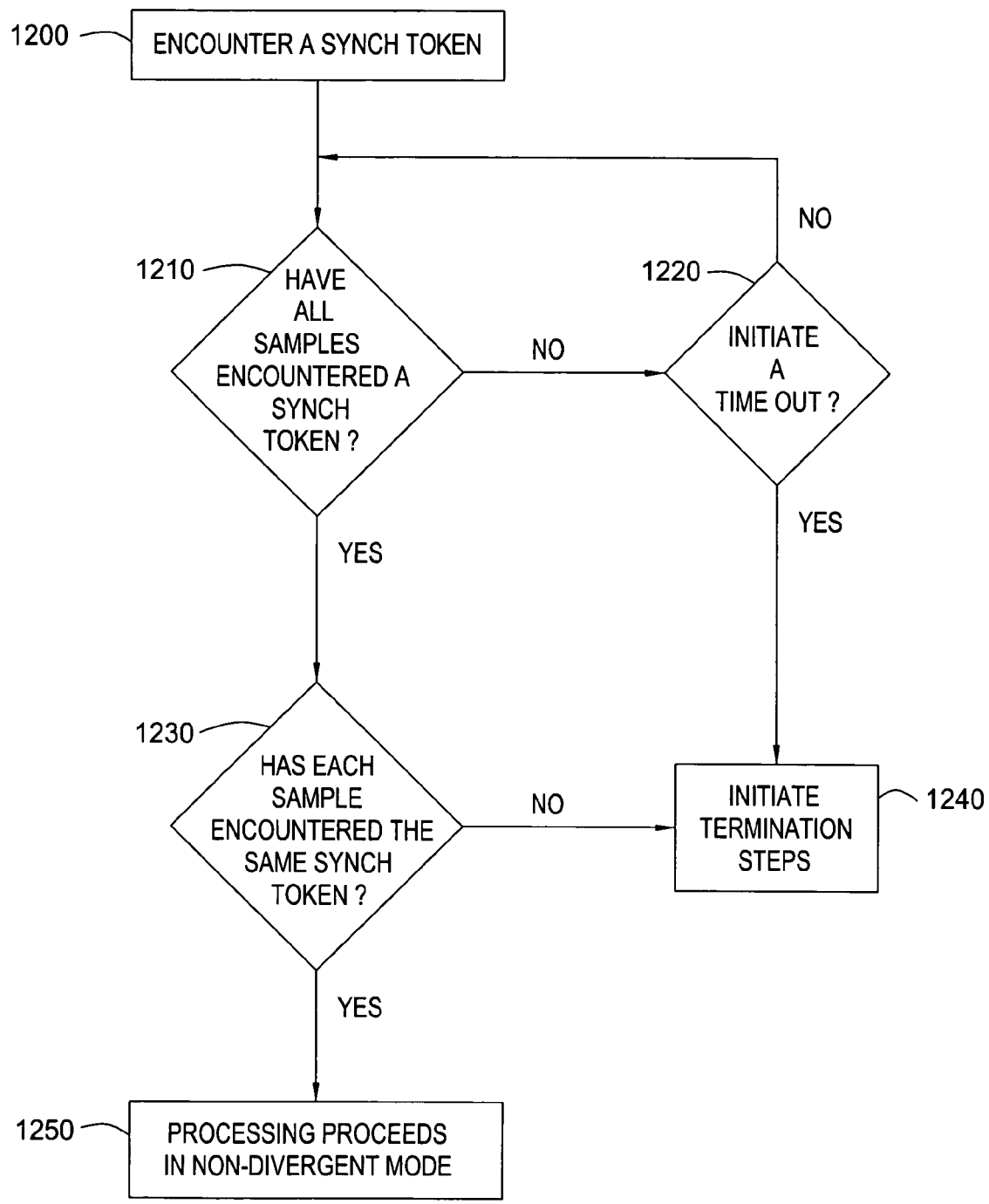
FIG. 12 is a flow chart of method steps for synchronizing one or more divergent samples, according to one embodiment of the invention.

FIG. 12 is a flow chart of method steps for synchronizing one or more divergent samples, according to one embodiment of the invention. Although the method steps are described in the context of the systems illustrated in FIGS. 7-11, any system configured to perform the method steps in any order is within the scope of the invention. This description assumes for illustrative purposes only that the operations specified in an instruction sequence are executed on a group of samples in execution pipeline 840 of FIG. 8 using processing threads. This description also assumes that one or more samples in the group have diverged, via a conditional branch, a jump, a call-return or the like, as previously described herein.

As shown in FIG. 12, the method of synchronizing starts in step 1200 where at least one sample of the group encounters a synch token. In one embodiment, a synch token is an instruction in the instruction sequence to synchronize the processing threads assigned to the group of samples. In an alternative embodiment, a synch token may be a bit within an instruction set to signal that a synchronization should occur before executing the instruction. Once a sample encounters a synch token, the multithreaded processing unit within execution pipeline 840 is configured to hold that sample idle and to wait for the other samples of the group to encounter a synch token.

In step 1210, the multithreaded processing unit determines whether each sample in the group of samples has encountered a synch token. If each sample has not encountered a synch token, the method proceeds to step 1220.

In step 1220, the multithreaded processing unit determines whether to initiate a time out. In one embodiment, the multithreaded processing unit is configured to wait a specified amount of time for the other samples of the group to encounter a synch token. If the specified amount of time elapses, then the multithreaded processing unit is configured to initiate the time out. If the multithreaded processing unit determines that it should not initiate a time out, then the multithreaded processing unit continues to wait for the other samples of the group to encounter a synch token and the method proceeds back to step 1210. If, however, the multithreaded processing unit determines that it should initiate a time out, then the method proceeds to step 1240, where the multithreaded processing unit initiates termination steps. Termination steps may include, for example, killing the program and sending out an error message, killing the synchronization and letting the samples continue to process asynchronously, dumping the samples and all related data, sending the samples and all related data to a specific buffer, letting the samples continue to process asynchronously and synching at the end or the like.

Referring again to step 1210, if each sample of the group has encountered a synch token, then the method proceeds to step 1230, where the multithreaded processing unit determines whether each sample has encountered the same synch token. If each sample has not encountered the same synch token, then the samples remain divergent and the method proceeds to step 1240 and termination steps are initiated. If, however, each sample has encountered the same synch token, then the samples have become non-divergent and the method proceeds to step 1250. As persons skilled in the art will understand, if every sample has encountered the same synch token, then the samples are all waiting for the same instruction in the program flow to be executed. Thus, each sample has the same PC and the same SD, indicating that they are non-divergent. In step, 1250, multithreaded processing unit proceeds to process the group of samples in non-divergent mode, synchronously executing each instruction in the instruction sequence on each of the samples in the group until another divergence occurs.

As persons skilled in the art will understand, the method of FIG. 12 is preferably implemented on a system with a MIMD architecture, such as the system of FIGS. 7 and 8, which is specifically designed to accommodate lots of conditional branching and jumps. Most systems, however, are not fully MIMD as such systems require large numbers of instructions, control paths and the like and, therefore, are expensive. Further, implementing the method of FIG. 12 also is expensive since doing so contemplates that every sample has its own PC, SD and stack.

For these reasons, the method of FIG. 12 may be modified for implementation on a more SIMD-oriented system, such as the system of FIGS. 1 and 2, to address a limited amount of divergence arising from conditional branches, jumps, call-returns and the like. As explained in further detail below in conjunction with FIG. 13, in such an implementation, each sample has its own PC, but a subroutine depth scoreboard is used to track the SD of each sample, and a global stack is used to store the global state data of the non-divergent samples while the divergent samples are processed. As persons skilled in the art will recognize, the method of FIG. 13 adds flexibility to SIMD-oriented systems as many current SIMD-oriented systems do not support any type of arbitrary branching. Further, implementing the modified method may be less expensive than implementing the method of FIG. 12 since the modified method may be implemented in a SIMD-oriented system instead of a MIMD-oriented system and also provides for the use of a global stack instead of individual stacks.

Figure 13:
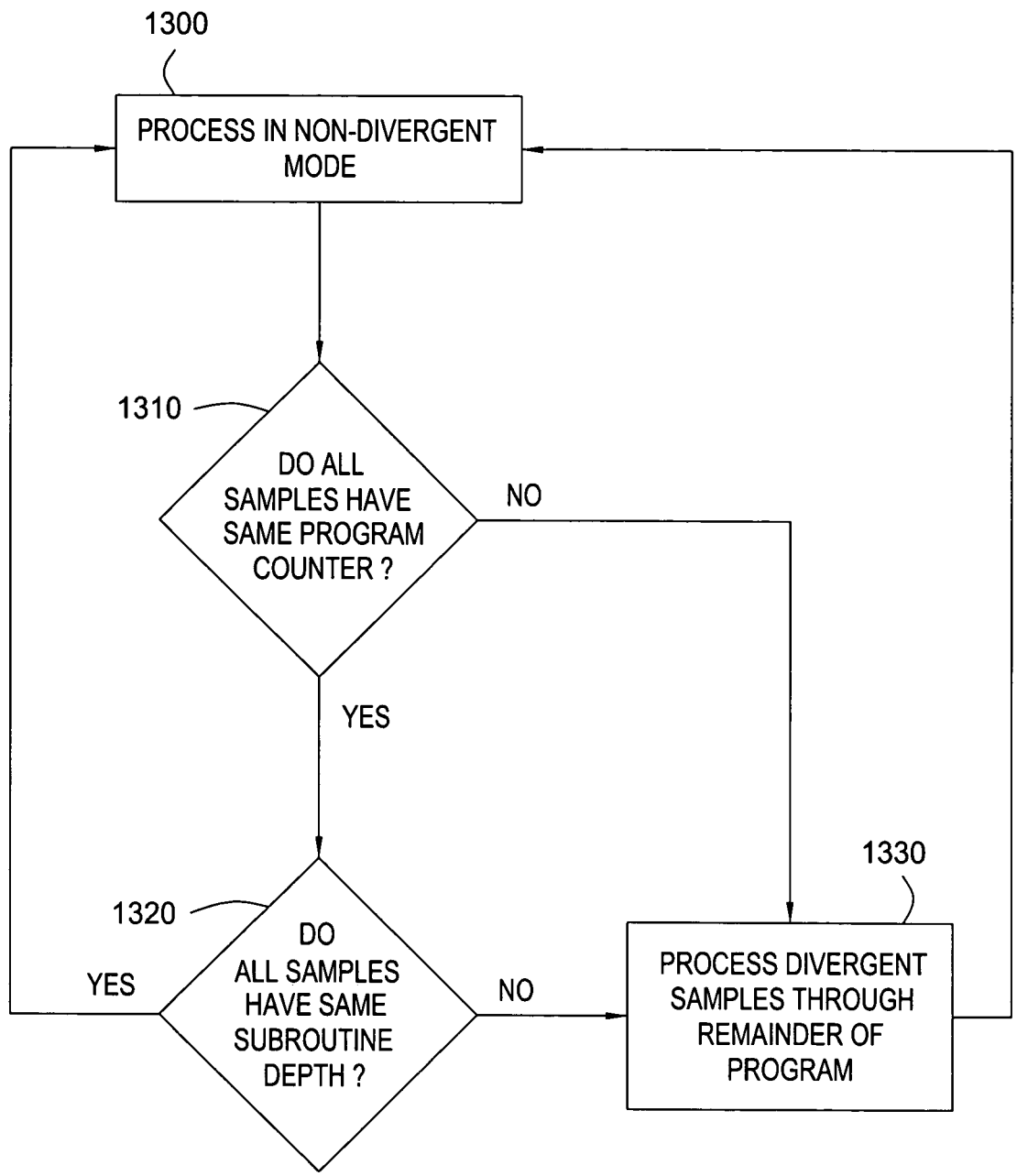
FIG. 13 is a flow chart of method steps for processing one or more divergent samples, according to another embodiment of the invention.

FIG. 13 is a flow chart of method steps for processing one or more divergent samples, according to another embodiment of the invention. Although the method steps are described in the context of the systems illustrated in FIGS. 1-12, any system configured to perform the method steps in any order is within the scope of the invention. This description assumes for illustrative purposes only that the operations specified in an instruction sequence are executed on a group of samples in recirculating shader pipeline 200 of FIG. 2 using modified processing threads (i.e., those that do not necessarily include an SD) instead of a PC token.

As shown in FIG. 13, the method of processing starts in step 1300 where the samples of a group are processed in non-divergent mode. As previously described herein, in non-divergent mode, each instruction of the instruction sequence is synchronously executed on each sample of the group. In step 1310, remap 250 determines whether each sample of the group has the same PC. Remap 250 may make this determination, for example, by comparing the PCs of the processing threads assigned to the samples. If remap 250 determines that the samples of the group do not all have the same PC, then a divergence has occurred, via a conditional branch, a jump or the like, and the method proceeds to step 1330.

In step 1330, remap 250 holds idle the non-divergent samples (i.e., the samples having the same PC) and pushes the global state data relating to the non-divergent samples onto the first stack level of the global stack. As previously explained herein, pushing the global state data of the non-divergent samples removes those samples from the working set of data. Remap 250, then processes the divergent samples through the entire fragment program. Once this processing is completed, remap 250 pops the global state data of the non-divergent samples from the global stack, restoring the non-divergent samples to the working set of data. The method then returns to step 1300 where the non-divergent samples are processed in non-divergent mode.

If, however, remap 250 determines that samples of the group all have the same PC, and the method proceeds to step 1320. In step 1320, remap 250 determines whether each sample of the group has the same SD. Remap 250 may make this determination, for example, by comparing the SDs of the samples stored in the subroutine depth scoreboard. If remap 250 determines that the samples of the group do not all have the same SD, then a divergence has occurred, via a call-return or the like, and the method proceeds to step 1330 where the divergent samples are processed. If, however, remap 250 determines that the samples of the group all have the same SD, then no divergence has occurred and the method returns to step 1300.

One advantage of the systems and method disclosed in FIGS. 1-6 is that they enable a graphics processor to accommodates divergences fragment processing pipeline 160 that are related to a call-return or the like. This capability increases the flexibility of a SIMD-oriented system by enabling such a system to operate in a divergent mode when doing so is desired.

One advantage of the systems and methods disclosed in FIGS. 7-13 is that they enable a graphics processor to accommodates divergences in execution pipeline 840, whether those divergences relate to a conditional branch, a jump, a call-return or the like. This capability enables a MIMD-oriented system to operate in a divergent mode when doing so is desired, but also to operate in a non-divergent mode such that the efficiencies of synchronous processing are not lost.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for processing a group of related divergent graphics samples in a programmable graphics processing unit having a recirculating pipeline implemented as a single instruction multiple data (SIMD) architecture, the method comprising:

configuring each of a plurality of programmable computation units by a field of codewords to perform an operation on multiple samples, incrementing a subroutine depth of a first sample of the related divergent samples to designate that a first call instruction and a first return instruction are to be executed on the first sample;

determining whether the first call instruction includes a call return that contains a second call instruction and modifying the state data of each of the samples to indicate a number of call returns associated with each of the samples;

pushing state data of a second sample of the related divergent samples upon which the first call and the first return instructions are not to be executed onto a global stack to define the second sample as idle;

dispatching a token associated with the samples into the pipeline along with all samples in the group of related divergent samples, executing the first call instruction and the first return instruction on the first sample, but not the second sample; and storing the processed divergent samples for output or display.

2. The method of claim 1, further comprising the step of holding the second sample idle and associating a sample depth in a sample depth score board with the first sample and each sample of the group of related samples, wherein the sample depth represents the number of call/return cycles to be executed on each of the samples.

3. The method of claim 2, wherein holding the second sample idle comprises encoding the second sample with non-operation information and pushing the second sample onto the global stack encoded with information that no operations are to be performed on the second sample, removing the second sample from the group of divergent samples on which operations are performed.

4. The method of claim 1, further comprising the step of incrementing the subroutine depth of the first sample to designate that second call instructions are to be executed on the first sample, and documenting the sample depth of the second sample and testing the sample depth of all samples of the group.

5. The method of claim 4, further comprising the step of executing the second call instructions on the first sample.

6. The method of claim 1, including comparing the state data associated with each sample in the group of related divergent samples to identify one or more of the samples with the greatest subroutine depth, and removing the identified samples from the working set of data samples in the pipeline which do not have the greatest subroutine depth.

7. The method of claim 6, further comprising the step of determining whether an instruction in an instruction sequence includes a call-return that contains the first call instructions, and dispatching a new token into the pipeline with the group of samples after each comparison of the state data.

8. A method of processing a group of related divergent graphics samples in a programmable graphics processing unit having a recirculating pipeline embodied as a single instruction multiple data (SIMD) architecture, the method comprising:
   configuring each of a plurality of programmable computation units by a field of codewords to perform an operation on multiple samples of the groups,
   identifying a first sample of the group of related samples having a first subroutine depth;
   holding idle a second sample having a second subroutine depth, the first subroutine depth being greater than the second subroutine depth;
   dispatching a token associated with the samples of the group into the pipeline along with all the group of samples;
   executing operations specified in first return instructions on the first sample;
   comparing the sample depth of all the samples of the groups of related samples;
   executing an operation specified in the token on samples of the groups of related samples having the greatest subroutine depth; and
   storing the processed divergent samples for output or display.

9. The method of claim 8, wherein holding idle a second sample comprises encoding the second sample with non-operation information.

10. The method of claim 8, wherein holding the second sample idle comprises encoding the second sample with non-operation information and pushing the second sample onto the global stack encoded with information that no operations are to be performed on the second sample, and removing the second sample from the group of divergent samples on which operations are performed.

11. The method of claim 8, further comprising the step of decrementing the first subroutine depth, making the first subroutine depth equal to the second subroutine depth.

12. The method of claim 11, further comprising the step of determining whether the first subroutine depth is greater than zero.

13. The method of claim 12, further comprising the step of identifying in an instruction sequence a next instruction to be executed if the first subroutine depth is equal to zero.

14. The method of claim 12, further comprising the step of executing second return instructions on the first sample and the second sample if the first subroutine depth is greater than zero.

15. The method of claim 14, further comprising the step of decrementing the first subroutine depth and the second subroutine depth.

16. A system for processing a group of related divergent graphics samples in a programmable graphics processing unit having a recirculating pipeline implemented as a single instruction multiple data (SIMD) architecture, the system comprising:
   a plurality of programmable computation units, each of the plurality of programmable computation units configured by a field of codewords to perform an operation on multiple samples of the groups;
   a subroutine depth scoreboard configured to store a subroutine depth corresponding to each sample of the groups of related samples;
   a global stack configured to store state data related to each sample of the group of related samples; and
   a remap configured to compare to subroutine depth of each of the samples of the group of related samples and to increment and decrement the subroutine depth in the subroutine depth scoreboard and to push state data onto and to pop state data from the global stack based on the decision as to which of the samples of the group of samples have the greatest subroutine depth.

17. The system of claim 16, wherein the remap is further configured to determine that first call instructions are to be executed on first samples selected as having the greatest subroutine depth, but not the second samples of the group identified as not having the greatest subroutine depth, to increment the first subroutine depth to designate that the first call instructions are to be executed on the first samples, and to push state data of the second samples onto the global stack.

18. The system of claim 17, wherein the remap is further configured to encode the second samples with non-operation data, to generate a PC token for executing the first call instructions, the PC token containing one or more codewords that configure programmable computation units within a recirculating shader pipeline to execute the first call instructions, and to dispatch the PC token into the recirculating shader pipeline, followed by the first samples and the second samples.

19. The system of claim 16, wherein the remap is further configured to determine that first return instructions are to be executed on the first samples, but not the second samples, to encode the second samples with non-operation data, to generate a PC token for executing the first return instructions, the PC token containing one or more codewords that configure programmable computation units within the recirculating shader pipeline to execute the first return instructions, and to dispatch the PC token into the recirculating shader pipeline, followed by the first samples and the second samples.

20. The system of claim 19, wherein the remap is further configured to decrement the first subroutine depth and to pop state data of the second samples from the global stack.

21. A system for processing a group of related divergent graphics samples in a programmable graphics processing unit, the system comprising:

means for configuring each of a plurality of programmable computation units by a field of codewords to perform an operation on multiple samples of the groups;

means for incrementing a first subroutine depth of a first set of samples of the groups of samples to designate that first call instructions are to be executed on the first set of samples based on identifying the first set of samples having a greater subroutine depth than any sample of the second set of samples;

means for maintaining a score board of subroutine depth for each sample of the groups of related samples;

means for comparing the subroutine depth of every sample of the groups of samples prior to executing each call instruction on any of the samples;

means for pushing state data of a second sample upon which the first call instructions are not to be executed onto a global stack;

means for dispatching all the samples of the groups of samples through the pipeline with a token for configuring the pipeline after each comparison of the subroutine depths of each of the samples;

means for executing the first call instructions on the first sample;

means for executing first return instructions on the first sample;

means for decrementing the first subroutine depth; and means for popping state data of the second sample from the global stack.

22. The system of claim 21, further comprising means for holding the second sample idle.

23. The system of claim 22, wherein means for holding comprises encoding the second sample with non-operation information.

24. The system of claim 21, further comprising means for determining whether the first subroutine depth is greater than zero and means for executing second return instructions on the first sample and the second sample if the first subroutine depth is greater than zero.

* * * * *